US012426592B2

(12) United States Patent
Haakenson et al.

(10) Patent No.: US 12,426,592 B2
(45) Date of Patent: Sep. 30, 2025

(54) PORTABLE LADDER AND STAND SYSTEMS

(71) Applicant: ARDISAM, INC., Cumberland, WI (US)

(72) Inventors: Bryant Haakenson, Amery, WI (US); Michael Furseth, Cumberland, WI (US); Jeremy Horst, Cumberland, WI (US); Lincoln Cullen, Menomonie, WI (US); Alexandra Huf, Houlton, WI (US); Cynthia Nesgoda, Rice Lake, WI (US)

(73) Assignee: ARDISAM, INC., Cumberland, WI (US)

( * ) Notice: Subject to any disclaimer, the term of this patent is extended or adjusted under 35 U.S.C. 154(b) by 0 days.

(21) Appl. No.: 18/777,358

(22) Filed: Jul. 18, 2024

(65) Prior Publication Data
US 2025/0221400 A1 Jul. 10, 2025

Related U.S. Application Data

(60) Provisional application No. 63/619,514, filed on Jan. 10, 2024.

(51) Int. Cl.
*A01M 31/02* (2006.01)
*A45F 4/02* (2006.01)

(52) U.S. Cl.
CPC ............. *A01M 31/02* (2013.01); *A45F 4/02* (2013.01); *A45F 2004/026* (2013.01)

(58) Field of Classification Search
CPC ..... A01M 31/02; A45F 4/02; A45F 2004/026; A45F 3/10; A45F 2004/006;
(Continued)

(56) References Cited

U.S. PATENT DOCUMENTS 4,582,165 A * 4/1986 Latini ................... A01M 31/02
182/20
4,727,961 A * 3/1988 Dawson ............... A01M 31/02
182/187
(Continued)

FOREIGN PATENT DOCUMENTS

CN 210353666 U * 4/2020
CN 213696022 U * 7/2021
(Continued)

OTHER PUBLICATIONS

Rivers Edge Treestands , "Grip Rail", URL: https://huntriversedge.com/collections/big-foot-climbing-systems/products/grip-rail%E2%84%A2. Web page visited Jul. 17, 2024.

*Primary Examiner* — Ryan D Kwiecinski
(74) *Attorney, Agent, or Firm* — Perkins Cole LLP

(57) ABSTRACT

A portable ladder and stand system includes a platform assembly, a plurality of nestable ladder portions, a pack portion, and a carrying assembly. A central compartment of the pack portion may be positioned in the nested ladder portions to carry the ladder portions. The pack portion may be attached to the platform assembly and the carrying assembly for a user to carry the system for transport to a deployment location (e.g., via shoulder straps), where the platform assembly and one or more of the nestable ladder portions may be attached to a support structure for a user to ascend the support structure and stand or sit on the platform assembly. The pack portion may be used separately from the remainder of the system.

34 Claims, 19 Drawing Sheets

(58) Field of Classification Search
CPC ...... A45F 2003/045; A45F 3/047; A45F 3/08;
A63B 27/00; E06C 1/08; E06C 1/38;
E06C 1/04; E06C 1/34; A47C 9/10;
A47C 13/00
See application file for complete search history.

(56) References Cited

U.S. PATENT DOCUMENTS

| | | | | |
|---|---|---|---|---|
| 4,782,918 A | * | 11/1988 | Brunner | A01M 31/02 182/187 |
| 5,242,030 A | * | 9/1993 | Lobozzo | E06C 1/34 182/20 |
| 5,409,083 A | * | 4/1995 | Thompson | A45F 3/26 182/187 |
| 5,454,445 A | * | 10/1995 | Berryman | E06C 7/14 182/100 |
| 5,871,133 A | * | 2/1999 | Robinson | A45C 3/004 224/628 |
| 5,975,389 A | * | 11/1999 | Braun | A45F 4/02 224/916 |
| 6,085,868 A | * | 7/2000 | Anthony | A01M 31/02 182/187 |
| 6,571,916 B1 | * | 6/2003 | Swanson | A01M 31/02 182/136 |
| 8,556,035 B1 | * | 10/2013 | Kendall | E06C 1/381 182/189 |
| D693,575 S | * | 11/2013 | Roose | D3/262 |
| 8,997,933 B2 | | 4/2015 | Furseth et al. | |
| 10,080,362 B1 | * | 9/2018 | Alexander | A01M 31/02 |
| 10,912,293 B1 | * | 2/2021 | Miller | A01M 31/02 |
| 11,154,048 B2 | * | 10/2021 | Power, II | E06C 1/381 |
| 11,602,213 B1 | * | 3/2023 | Leach | A01M 31/02 |
| 2007/0228098 A1 | * | 10/2007 | Teeters | A45F 3/10 224/633 |
| 2008/0128204 A1 | | 6/2008 | Engstrom | |
| 2010/0006610 A1 | * | 1/2010 | Stinnett | A45C 13/28 224/153 |
| 2010/0176263 A1 | * | 7/2010 | Ehrig | A01M 31/02 248/304 |
| 2011/0132686 A1 | * | 6/2011 | Priest | A01M 31/02 182/187 |
| 2012/0080267 A1 | * | 4/2012 | Furseth | E06C 7/48 182/115 |
| 2017/0265454 A1 | * | 9/2017 | Kramer | A01M 31/02 |
| 2018/0073298 A1 | * | 3/2018 | Hand | E06C 1/381 |
| 2018/0192634 A1 | * | 7/2018 | Check | A01M 31/02 |
| 2019/0055782 A1 | * | 2/2019 | Infalt | E06C 1/34 |
| 2019/0313776 A1 | * | 10/2019 | Ripepi | A45F 3/10 |
| 2021/0204538 A1 | * | 7/2021 | Power | A01M 31/02 |
| 2021/0386181 A1 | * | 12/2021 | Farmer, II | A45F 3/10 |
| 2023/0248135 A1 | * | 8/2023 | Farmer | A01M 31/02 224/191 |
| 2024/0032676 A1 | * | 2/2024 | Finster | A45F 3/08 |
| 2024/0200406 A1 | * | 6/2024 | Hanshaw | A01M 31/02 |

FOREIGN PATENT DOCUMENTS

| | | | |
|---|---|---|---|
| CN | 115288599 A | * 11/2022 | |
| WO | WO-9419985 A1 | * 9/1994 | A45F 3/08 |
| WO | WO-2005110148 A1 | * 11/2005 | A45F 3/04 |

* cited by examiner

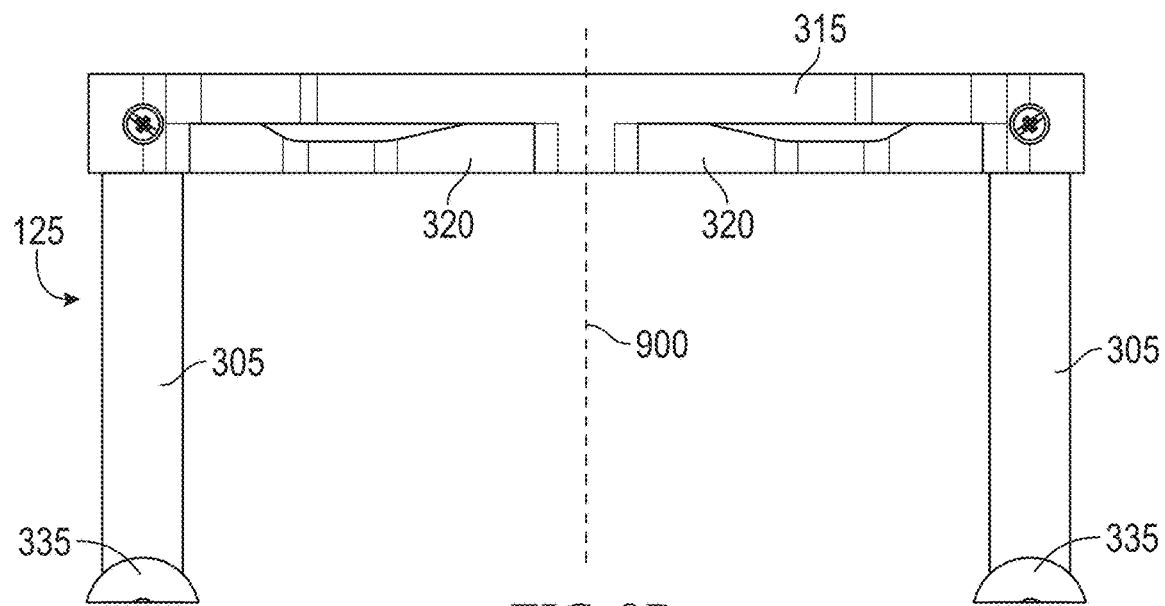
FIG. 9B
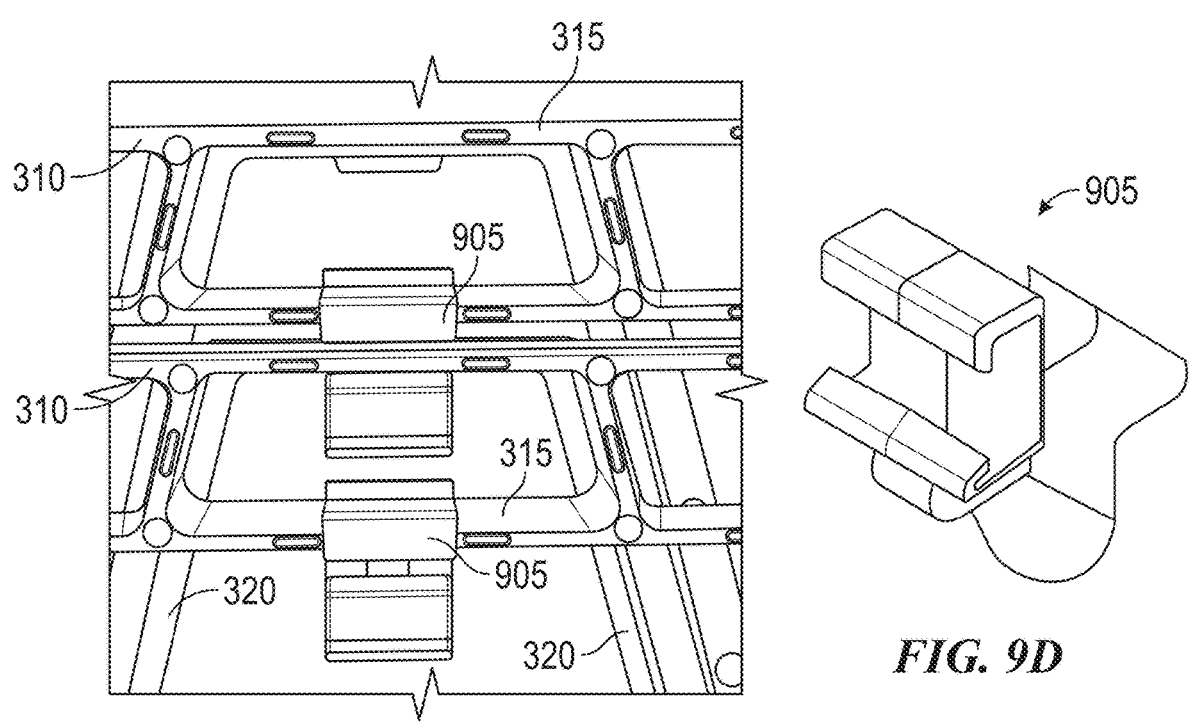
FIG. 9C
FIG. 9D

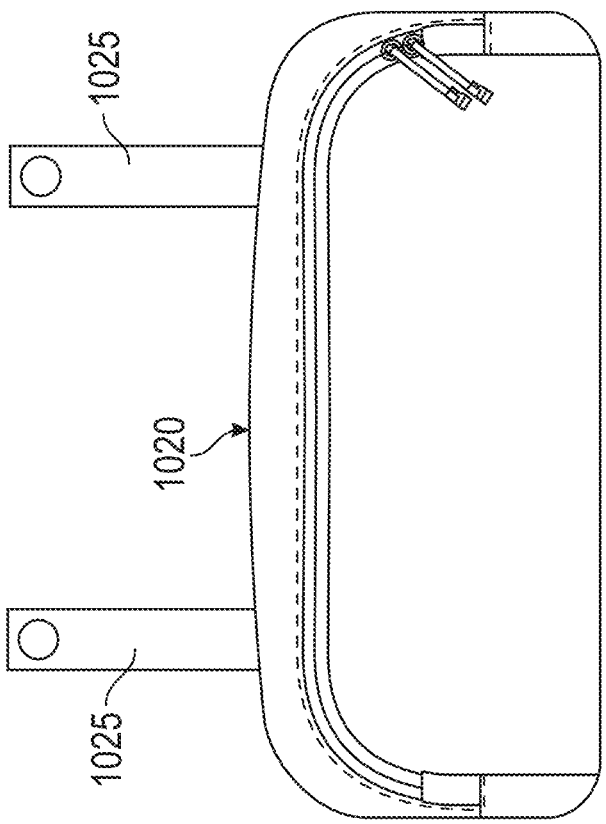
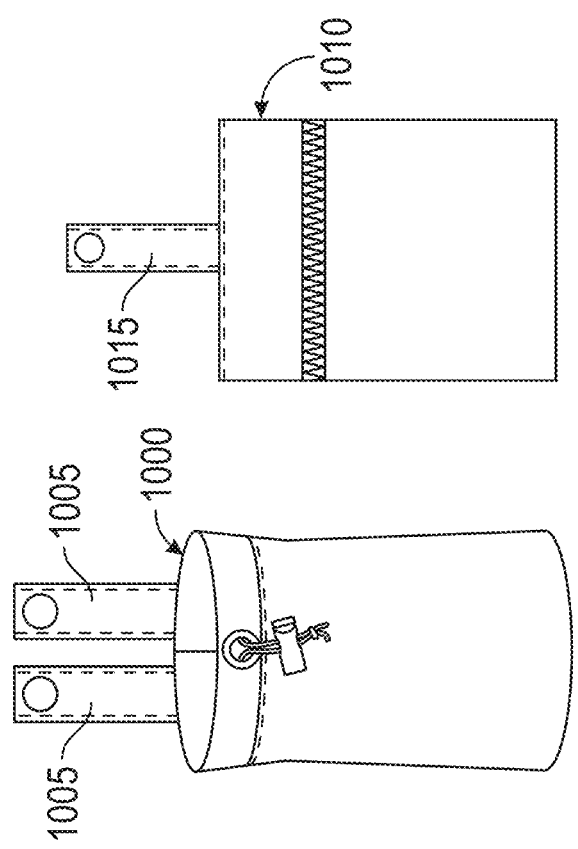
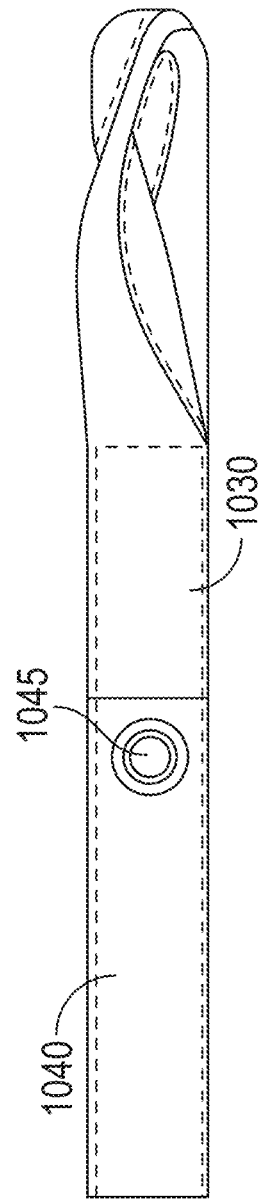

PORTABLE LADDER AND STAND SYSTEMS

CROSS-REFERENCE TO RELATED APPLICATION(S)

The present application claims priority to U.S. Provisional Patent Application No. 63/619,514, filed Jan. 10, 2024, which is incorporated herein by reference in its entirety.

BACKGROUND

Conventional tree stands for hunting or other outdoor activities are often heavy, complicated, and/or difficult for one person to carry and assemble in the field. For example, some tree stands involve long ladders that are not easily transported. Some tree stands may use a ladder with a single pole to improve portability, but such single-pole systems have less stability than a ladder with two parallel support poles. Ladders with two parallel support poles exist, but conventional systems are insufficiently portable. Aspects of embodiments of the present technology address these drawbacks and other drawbacks.

SUMMARY

Representative embodiments of the present technology include a portable ladder and stand system. The portable ladder and stand system may include a platform assembly, a plurality of nestable ladder portions, a pack portion, and a carrying assembly. Part of the pack portion (e.g., a central compartment of the pack portion) may be positioned in the nested ladder portions to carry the ladder portions. The pack portion may be attached to the platform assembly and the carrying assembly (e.g., via one or more straps) for a user to carry the system for transport to a deployment location, where the platform assembly and one or more of the nestable ladder portions may be attached to a support structure for a user to ascend the support structure and stand or sit on the platform assembly. The pack portion may be used separately from the remainder of the system.

Other features and advantages will appear hereinafter. The features described herein can be used separately or together, or in various combinations of one or more of them.

BRIEF DESCRIPTION OF THE DRAWINGS

In the drawings, wherein the same reference number indicates the same element throughout the several views:

FIG. 9B illustrates a plan view of part of the ladder portion shown in FIG. 9A,

FIG. 9C illustrates a detailed top perspective view of two rungs of the ladder portion shown in FIG. 9A, the rungs nested together in accordance with embodiments of the present technology;

FIG. 9D illustrates a perspective view of a clip element for securing two ladder portions together;

FIGS. 10A-10D illustrate plan views of accessories according to embodiments of the present technology.

DETAILED DESCRIPTION

The present technology is directed to portable ladder and stand systems, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments. Accordingly, embodiments of the present technology may include additional elements or exclude some of the elements described below with reference to FIGS. 1-10D, which illustrate examples of the technology.

The terminology used in this description is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Numerical adjectives including "first" and "second," or the like, as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims. As used herein, the terms "generally" and "approximately" refer to values or characteristics within a range of ±10% from the stated value or characteristic, unless otherwise indicated. For purposes of the present disclosure, a first element that is positioned "toward" an end of a second element is positioned closer to that end of the second element than to a middle or mid-length location of the second element.

Figure 1:
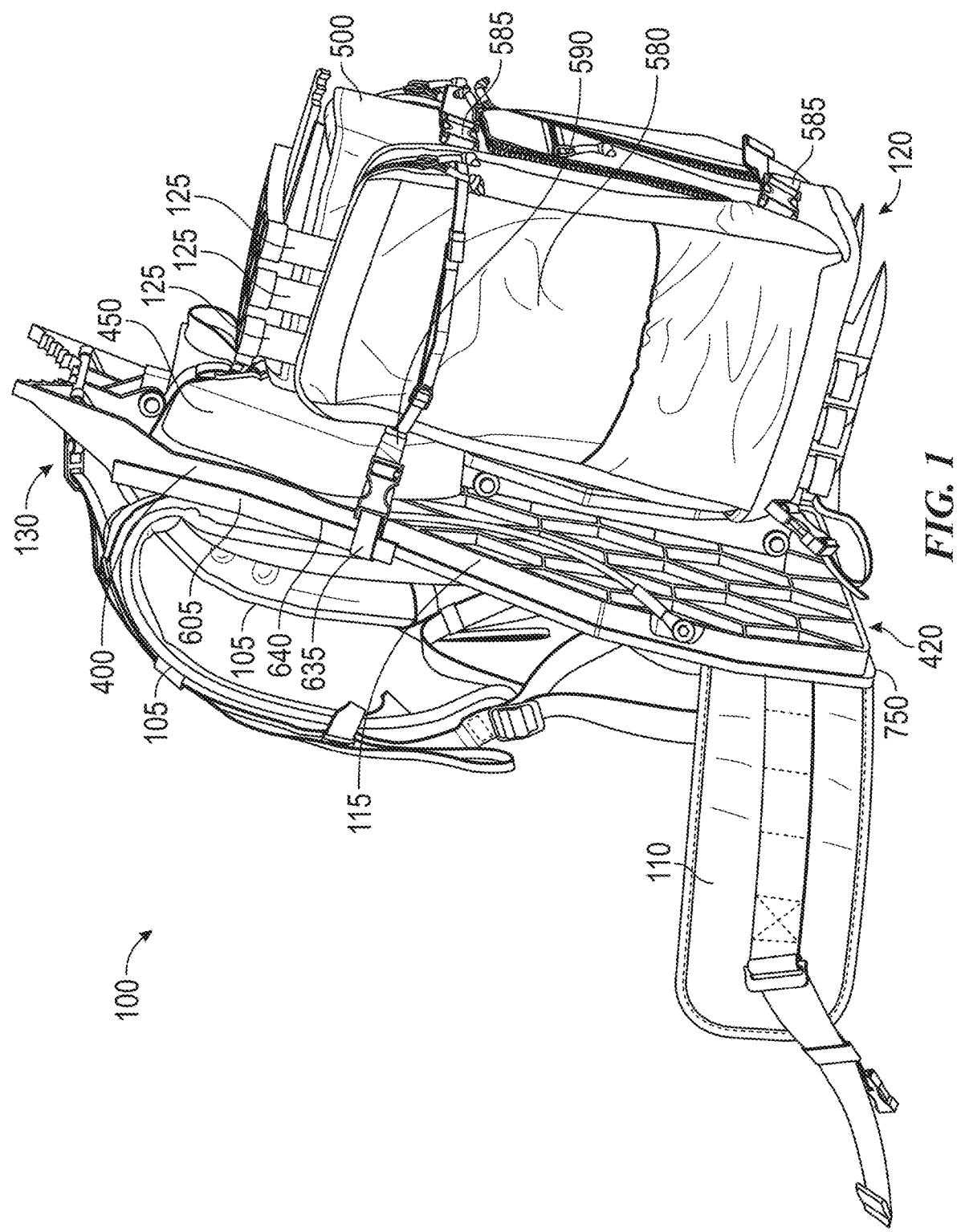
FIG. 1 illustrates a side perspective view of a portable ladder and stand system configured in accordance with embodiments of the present technology, in a stowed configuration for transportation by a user.

FIG. 1 illustrates a side perspective view of a portable ladder and stand system 100 configured in accordance with embodiments of the present technology, in a stowed configuration for transportation by a user. The system 100 enables a user to carry a ladder and stand (e.g., for hunting) in one assembly that also includes a storage pack, via shoulder straps 105 for supporting the system 100 on a user's shoulders and an optional waist belt 110 for wrapping around at least part of a user's waist region.

The system 100 may include a platform assembly 115, a pack portion 120, one or more ladder portions 125, and a carrying assembly 130 (e.g., for carrying by a user), each of which is described in detail below. Advantageously, the ladder portions 125 surround or nest around part of the pack portion 120, and the platform assembly 115 serves as a backing portion to provide structure for the system while it is transported in the stowed configuration. Because the ladder portions 125 surround part of the pack portion, the pack portion has available space for a user to store gear, supplies, or other components of the system. And, as will be explained in further detail below, the pack portion 120 may include its own carrying straps (e.g., shoulder straps) that allow a user to use the pack portion 120 separately from the platform assembly 115 and the carrying assembly 130. The platform assembly 115 may include one or more platform attachment elements, such as one or more blades or straps described below, positionable to support the platform assembly 115 on a support structure. Each ladder portion 125 may include one or more ladder attachment elements, such as one or more blades or straps described below, positionable to support the ladder portion on the support structure. Accordingly, the system 100 provides an efficient tree stand system that may be transported and assembled by one user without assistance.

Figure 2:
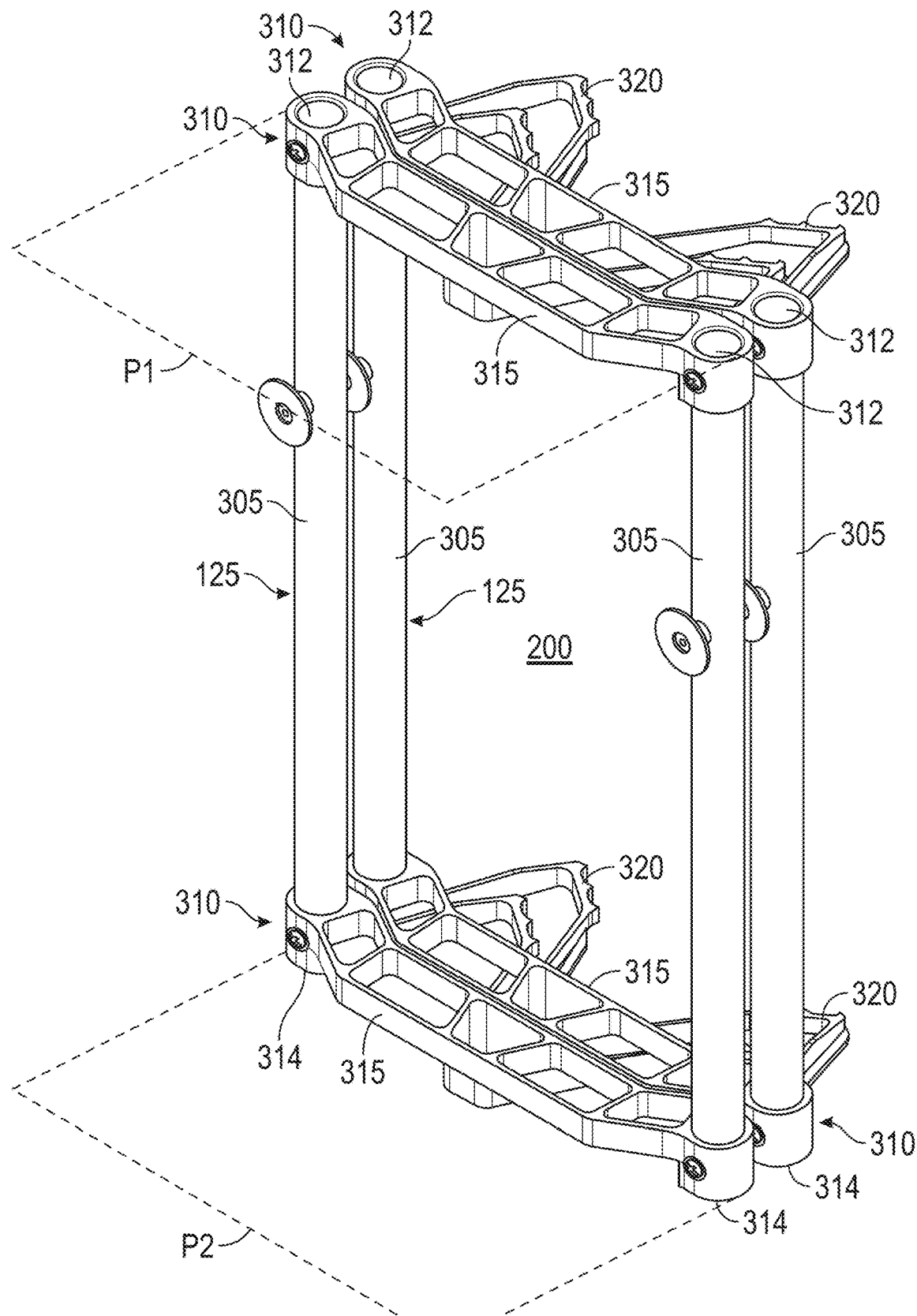
FIG. 2 illustrates a perspective view of two ladder portions configured in accordance with embodiments of the present technology, in which the two ladder portions are nested with each other and provide a space in which part of a pack portion of the system may be received.

In FIG. 1, three ladder portions 125 are nested around part of the pack portion. FIG. 2 illustrates a perspective view of two ladder portions 125 configured in accordance with embodiments of the present technology, in which the two ladder portions 125 are nested with each other and provide a space 200 in which part of the pack portion 120 may be received. In some embodiments, each ladder portion 125 may be separate from, but identical to, each other ladder portion 125, yet, as explained in further detail below and as shown in FIG. 2, they remain nestable.

Figure 3:
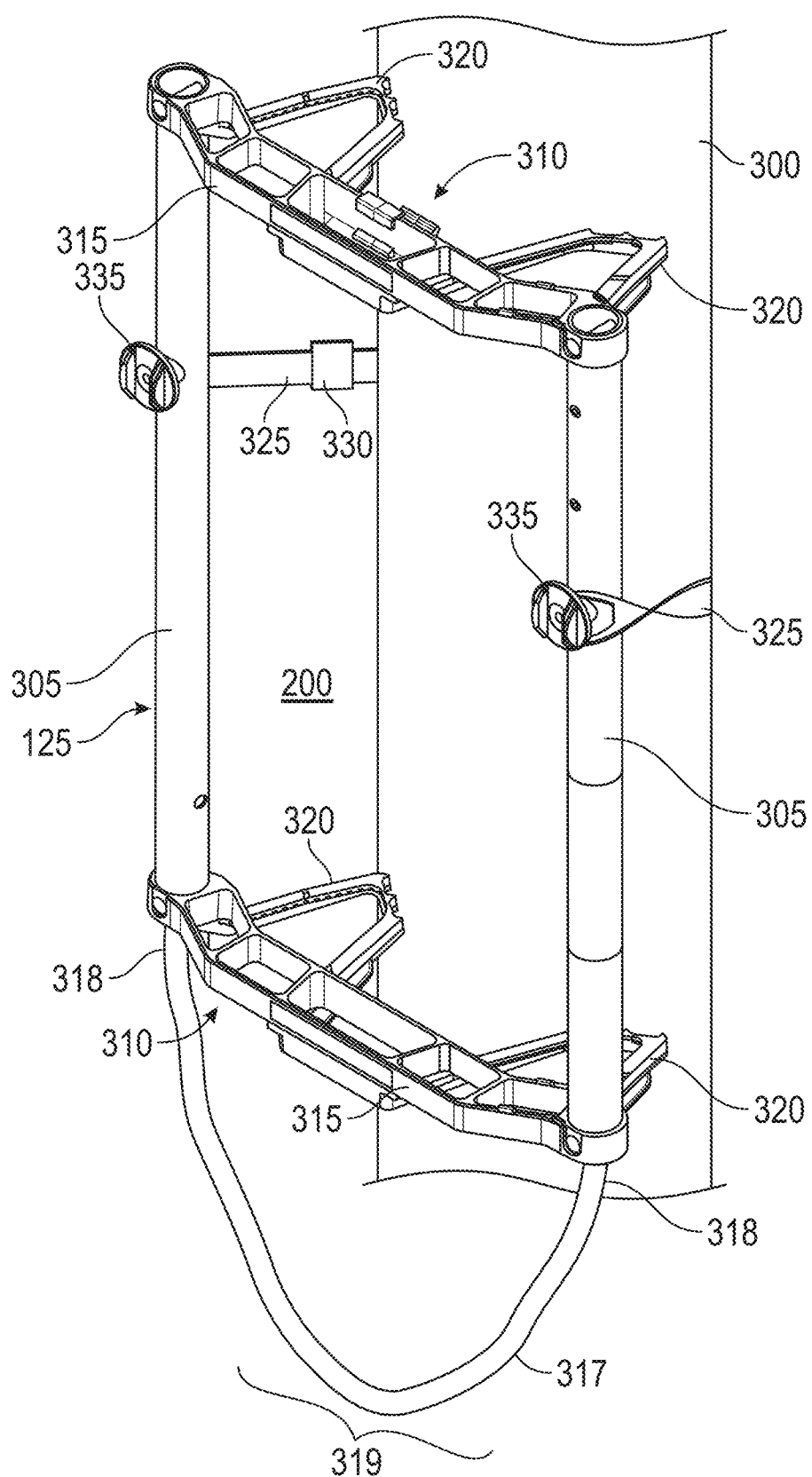
FIG. 3 illustrates a perspective view of one of the ladder portions attached to a support structure such as a tree, pole, or other suitable structure that a user may ascend to install a platform for hunting or other activities.

FIG. 3 illustrates a perspective view of one of the ladder portions 125 attached to a support structure 300, such as a tree, pole, or other suitable structure that a user may want to climb to install a platform for hunting or other activities.

In some embodiments, one or more (such as each) of the ladder portions 125 may include two elongated siderails 305 spaced apart from each other by a distance greater than, or at least approximate to, a width of part of the pack portion 120 received in the space 200 (see FIG. 1). Each ladder portion 125 may further include two rungs 310. One of the rungs 310 may be attached to top ends of the siderails, and another rung 310 may be attached to bottom ends of the siderails. The rungs 310 may form upper and lower bounds of the space 200 for receiving the part of the pack portion 120 (see FIG. 1). Each of the rungs 310 may function as a step and, optionally, as a mounting point for attaching the ladder portion 125 to the support structure 300. For example, in some embodiments, one or each of the rungs 310 may include a step portion 315 for a user to step on or grasp with their hands while climbing.

In some embodiments, a step-to-step distance between rungs 310 may be approximately 18 inches, or other suitable values. Each ladder portion 125 may have an overall width of approximately 9.75 inches, or another suitable width. In some embodiments, the ladder portion 125 may extend away from the support structure 300 about five inches, or another suitable distance for enabling a user to fit their feet/shoes on the rungs 310. The spacing from the support structure 300 also improves the user's ability to engage aiders or other loops hanging from the ladder portion 125. For example, FIG. 3 illustrates one such representative aider 317. Each end 318 of the aider 317 may be connected to a corresponding end of a rung 310 or to a corresponding siderail 305, which advantageously spaces apart the ends of the aider 317 to widen a foot receiving portion 319 of the aider 317 for a stable place for a user to position their feet or hands while ascending the ladder portion 125.

One or each of the rungs 310 may further include one or more (such as two) blade portions 320 attached to the step portion 315 and extending from the step portion 315 to engage the support structure 300 to support the ladder portion 125 on the support structure 300. For example, the blade portions 320 may include teeth or jaws to press or cut into the support structure 300 or to otherwise grip the support structure 300 to resist or prevent movement of the ladder portion 125 along the surface of the support structure 300.

Additionally or alternatively (depending on the construction of the blade portions 320), the system 100 may include one or more ladder mounting straps 325 for lashing around the support structure 300 to hold each ladder portion 125 tightly against the support structure 300. The one or more ladder mounting straps 325 may include one or more ratchet devices 330 for tightening the ladder mounting straps 325 against the support structure 300. In some embodiments, the ladder portions 125 may include mounting strap attachment elements 335 for connecting the one or more ladder mounting straps 325 to the ladder portions 125, such as mounting nubs positioned on the elongated siderails 305. Tightening the ratchet device 330 causes the blade portions 320 to frictionally engage or dig into the support structure 300 for secure attachment to the support structure 300.

Returning to FIG. 2, a ladder system may include a plurality (e.g., three as shown in FIG. 1) of separate, identical ladder portions 125. In some embodiments, for each ladder portion 125 of the plurality of ladder portions 125, a first rung 310 of the two rungs 310 is attached to a first end 312 of each of the two elongated siderails 305, and a second rung 310 of the two rungs 310 is attached to a second end 314 of each of the two elongated siderails 305. The ladder portions 125 are nestable with each other, such that when the ladder portions 125 are nested with each other, the first ends 312 of the siderails 305 are coplanar in a first plane P1, and the second ends 314 of the siderails 305 are coplanar in a second plane P2 spaced apart from the first plane. Thus, the siderails 305 themselves need not be offset or differently sized to facilitate stacking/nesting of the ladder portions 125. Although only two ladder portions 125 are shown in FIG. 3, the nesting configuration in FIG. 3 is repeatable for any suitable number of ladder portions 125, and the ladder portions 125 will still be aligned with each other without diverging from the planes P1, P2.

Figure 4:
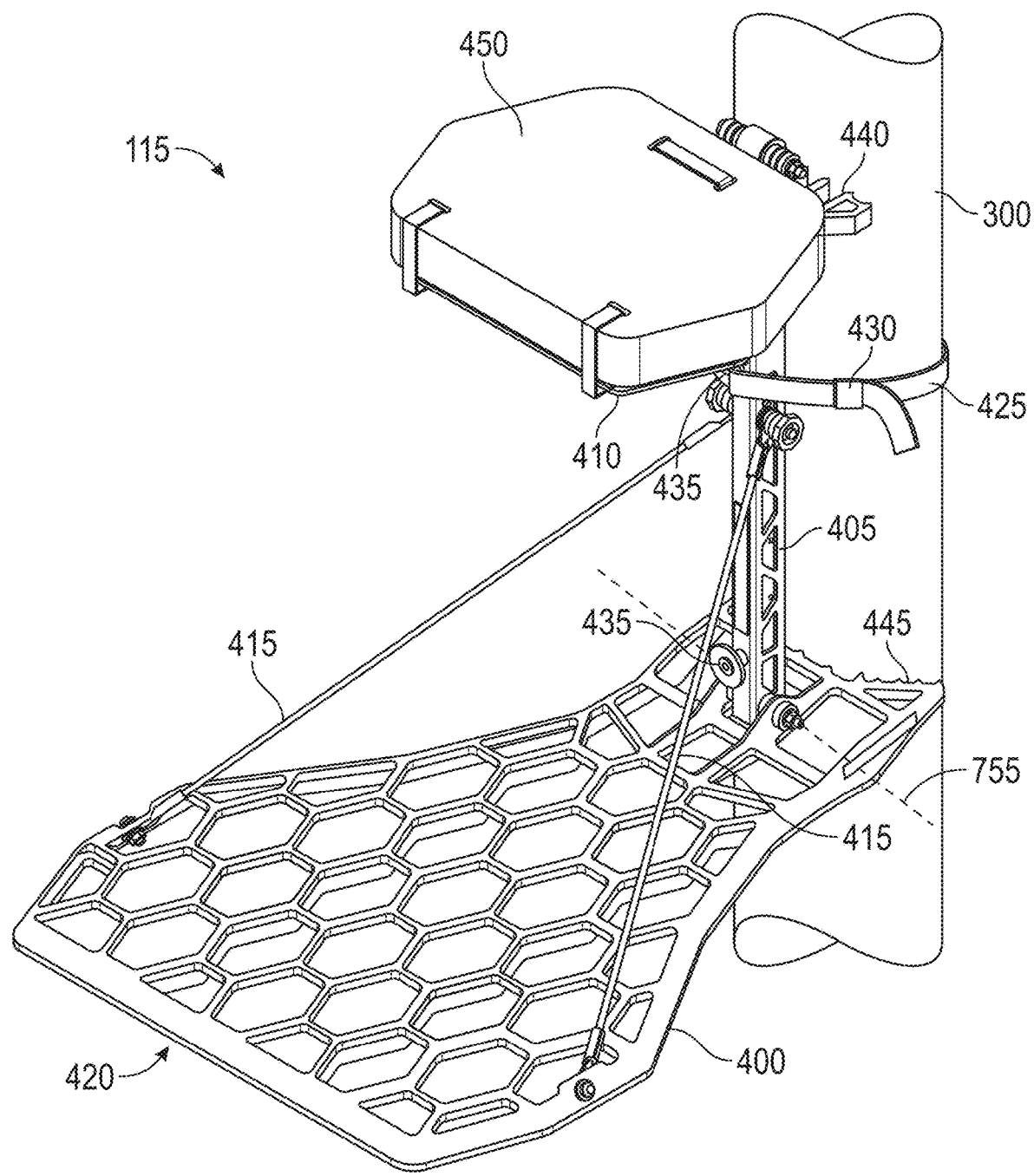
FIG. 4 illustrates a perspective view of a platform assembly of the system in a deployed configuration and attached to the support structure.

FIG. 4 illustrates a perspective view of the platform assembly 115 in a deployed configuration, attached to the support structure 300. Optionally, the platform assembly 115 may be deployed such that it is positioned above one or more of the ladder portions 125 attached to the support structure 300 (see FIG. 3). The user can ascend one or more of the ladder portions 125 to sit or stand on the platform assembly 115 for hunting, observation, or other activities.

In some embodiments, the platform assembly 115 includes a base platform 400 and a seat support post 405 rotatably attached to the base platform 400 toward a first end of the seat support post 405. The platform assembly 115 may further include a seat platform 410 rotatably attached to the seat support post 405 toward a second of the seat support post 405 opposite the first end of the seat support post 405. The platform assembly 115 may optionally include one or more tension elements such as cables 415 extending between, and connecting, the seat support post 405 to the base platform 400. The cables 415 may be connected toward a distal end 420 of the base platform 400 and toward an upper end of the seat support post 405 such that the cables 415 are angled relative to each of the seat support post 405 and the base platform 400 and provide additional support to keep the base platform 400 generally level for a user to stand on.

The system 100 may further include one or more platform mounting straps 425 for lashing around the support structure 300 to hold the platform assembly 115 tightly against the support structure 300. The one or more platform mounting straps 425 may include one or more tightening devices 430 (such as ratcheting devices) for tightening the platform assembly 115 to support structure 300. In some embodiments, the platform assembly 115 may include mounting strap attachment elements 435 for connecting the one or more platform mounting straps 425 to the platform assembly 115 (e.g., to the seat support post 405), such as mounting nubs positioned on the seat support post 405. Although one platform mounting strap 425 is shown in FIG. 4, each of the mounting strap attachment elements 435 may optionally accommodate a corresponding platform mounting strap 425 to customize the level of tension against the support structure 300.

The platform assembly 115 may further include one or more blade portions for engaging the support structure 300, such as a blade portion 440 attached to the seat support post 405 toward the seat platform 410, at another location along the seat support post 405, or attached to the seat platform 410 itself. The blade portion 440 may extend away from the seat support post 405 to frictionally engage the support structure 300 or to cut or dig into the surface of the support structure 300, to support the platform assembly 115 on the support structure 300.

The base platform 400 may further include a blade portion 445 attached to the base platform 400 and extending from the base platform 400 toward the support structure 300, to engage with the support structure via friction or by penetrating (e.g., cutting or digging) into the surface of the support structure 300, to support the platform assembly 115 on the support structure 300. When attached to the support structure 300, a user can stand on the base platform 400 or sit on the seat platform 410, such as on a cushioned seat 450 positioned on the seat platform 410. In some embodiments, the upper blade portion 440 may include several prongs to facilitate at least two prongs engaging an irregular surface like a tree.

In some embodiments, the base platform 400 may fit within a space of approximately 20 inches wide by 28 inches long, or it may have other suitable dimensions. The base platform 400 may taper from the wider distal end 420 toward the blade portion 440. In some embodiments, the seat platform 410 may fit within a space of approximately 10 inches by 13 inches, or it may have other suitable dimensions. In some embodiments, the cushioned seat 450 may be approximately two inches thick, or it may have other suitable dimensions. The platform assembly 115 may weigh approximately eight to nine pounds, or other suitable amounts, depending on material (which may include aluminum or aluminum alloy, or other suitable materials) and depending on construction. For example, the base platform 400 and the seat platform 410 may include a hex-type pattern (as generally illustrated) for structural stability and weight savings.

Figure 5A:
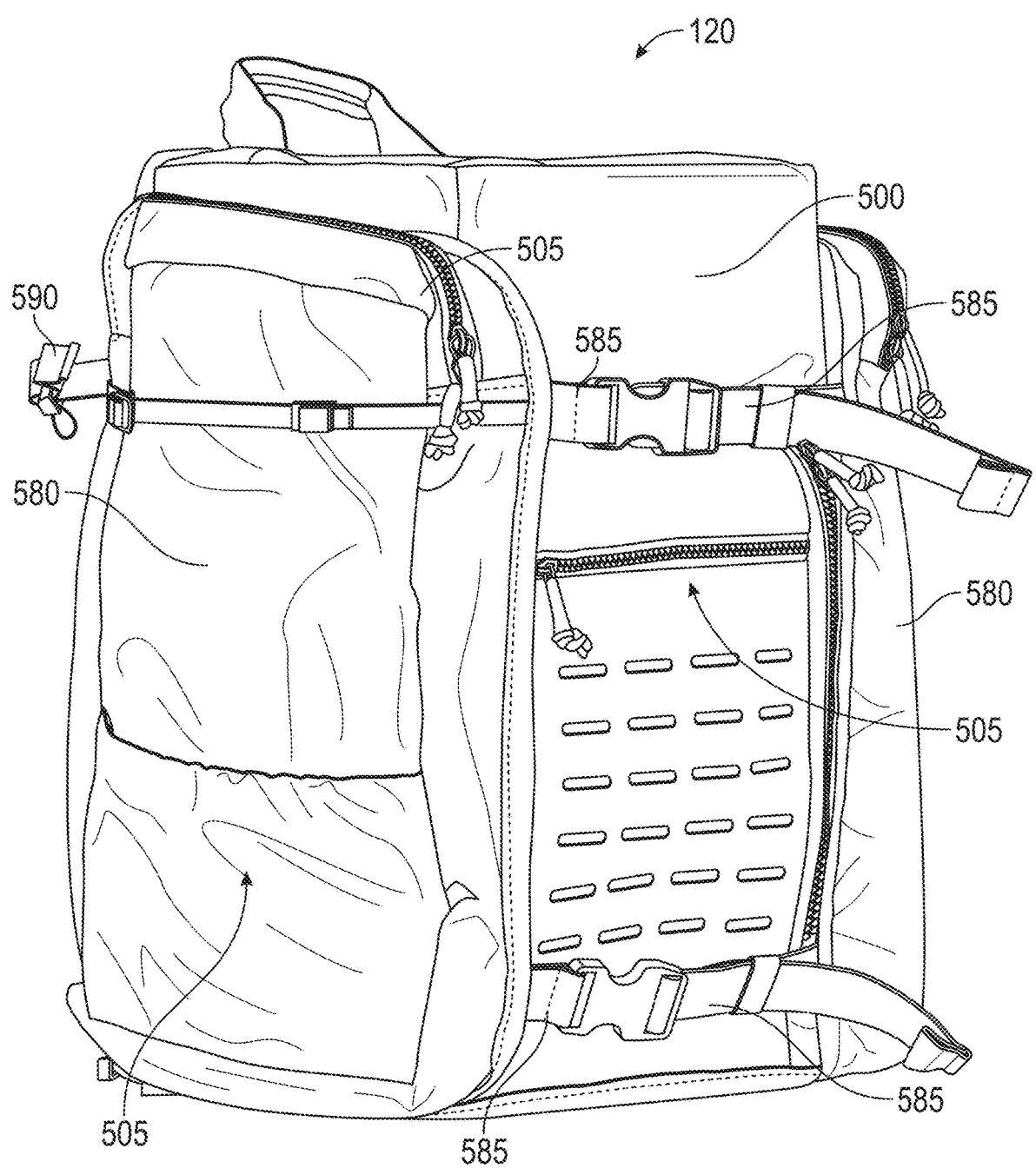
FIG. 5A illustrates a rear-side perspective view of the pack portion, configured in accordance with embodiments of the present technology.

FIG. 5A illustrates a rear-side perspective view of the pack portion 120, configured in accordance with embodiments of the present technology. For consistency in description herein, but without limiting the scope of embodiments of the present technology, the term "rear" is a side or orientation facing a direction extending behind a user wearing the system 100 or the pack portion 120, while the term "front" is a side or orientation facing along a direction extending forward of a user wearing the system 100 or the pack portion 120.

Figure 5B:
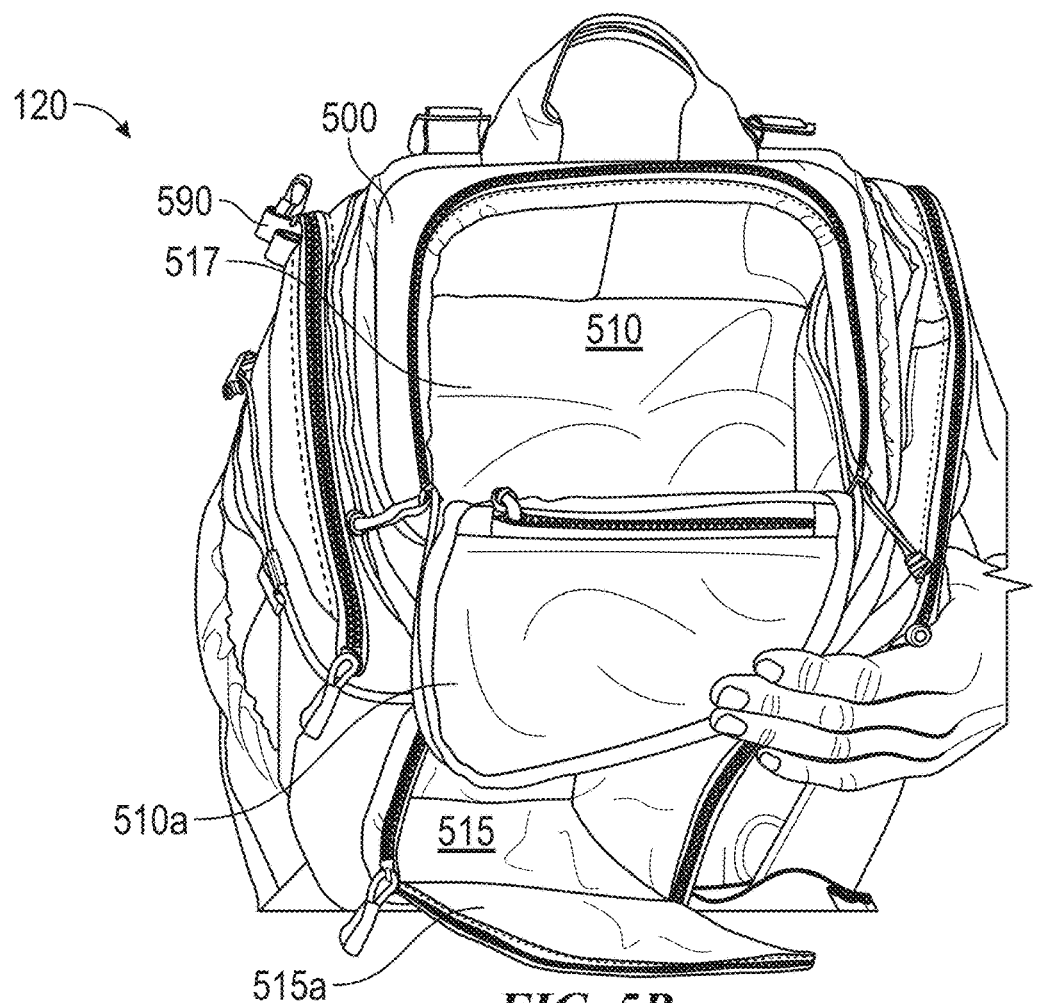
FIG. 5B illustrates a top perspective view of the pack portion shown in FIG. 5A, FIGS. 5C and 5D illustrate bottom perspective views of the pack portion shown in FIG. 5A.

FIG. 5B illustrates a top perspective view of the pack portion 120 shown in FIG. 5A. In FIGS. 5A and 5B, the pack portion 120 is separated from the platform assembly 115, the ladder portions 125, and the carrying assembly 130, such that it may be used independently from other components of the system 100. The pack portion 120 may include a central compartment 500 and a plurality of side and rear pockets 505 of various suitable configurations distributed around the pack portion 120. With reference to FIG. 5B, the central compartment 500 may include one or more internal pockets, such as an upper internal pocket 510 formed at least in part by an upper closeable cover 510a positioned on a top portion of the central compartment 500, and a lower internal pocket 515 formed at least in part by a rear closeable cover 515a.

The closeable covers 515a, 515b may be openable or closable via zippers, snaps, or any other opening or closing device suitable for forming the internal pockets 510, 515. A movable/adjustable shelf 517 may separate the upper and lower internal pockets 510, 515, or the shelf may be removed. The walls of the pack portion 120 may include or contain plastic panels, or they may comprise stiff material, for stiffening the pack portion into a generally rectangular shape to support the ladder portions 125. In some embodiments, the pack portion may weigh approximately four pounds, or other quantities, and it may be approximately 16 inches tall by 9 inches wide by 8.25 inches deep, or it may have other dimensions.

Figure 5C:
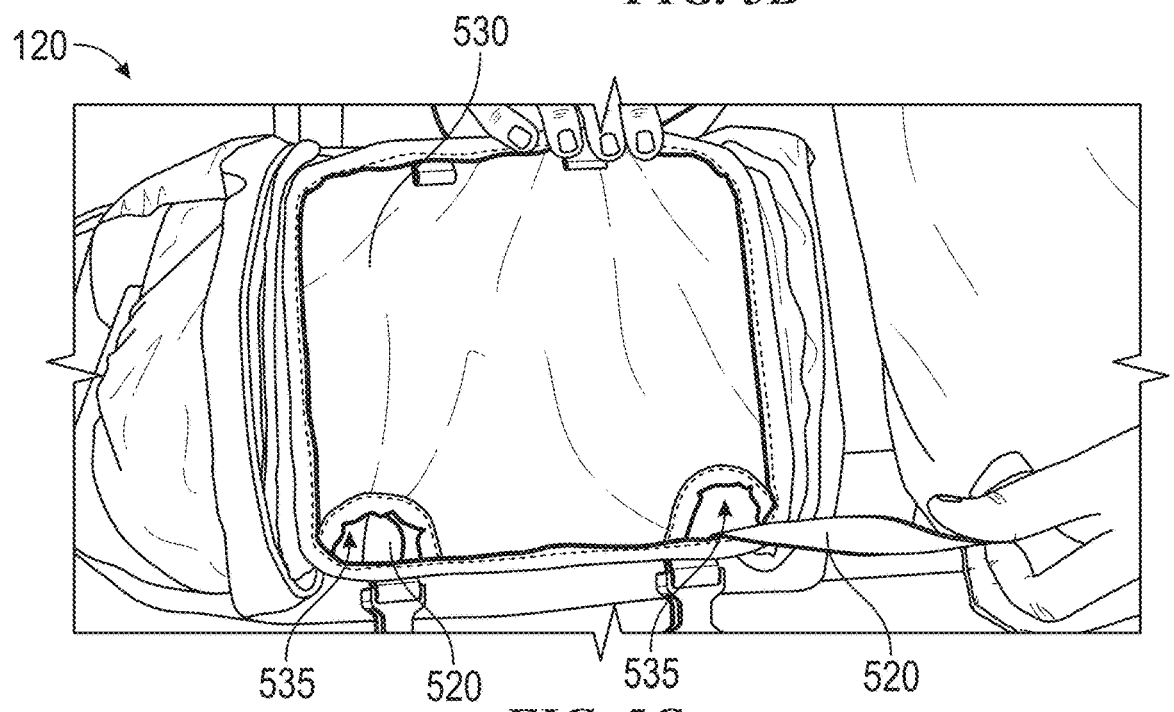
FIGS. 5E and 5F illustrate front perspective and side-front perspective views, respectively, of the pack portion shown in FIG. 5A, in accordance with embodiments of the present technology.
FIGS. 5G, 5H, and 5I illustrate a side perspective, rear plan, and front plan view of the pack portion, in accordance with embodiments of the present technology.
Figure 5D:
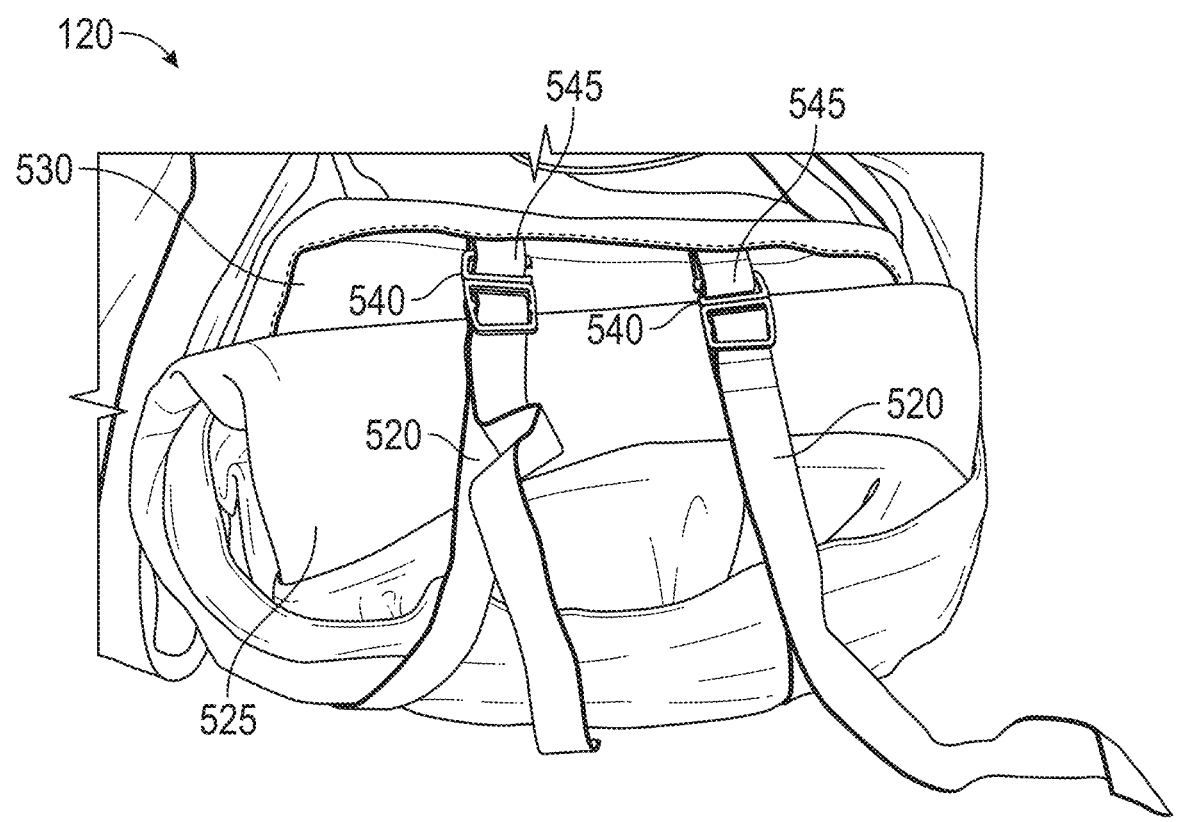

FIGS. 5C and 5D illustrate bottom perspective views of the pack portion 120. In some embodiments, the pack portion 120 may include one or more, such as two, bottom straps 520 for carrying one or more items 525 externally to the pack portion 120, such as a coat or a blanket, as shown in FIG. 5D. A bottom panel 530 of the pack portion 120 may include a strap storage space 535 for tucking or storing the bottom straps 520 into the bottom panel 530 when they are not in use. In some embodiments, the strap storage space 535 may be formed by two adjacent layers of material forming the bottom panel 530, with one or more openings for accessing a space between the two adjacent layers. In FIG. 5C, a user is shown deploying one of the straps 520 from between the adjacent layers of the bottom panel 530. With reference to FIG. 5D, ends of the bottom straps 520 may include G-hooks or J-hooks 540, or other suitable connections, for engaging loops 545 attached to or near the bottom panel 530 to support the straps 520 while they hold the one or more items 525.

Figure 5F:
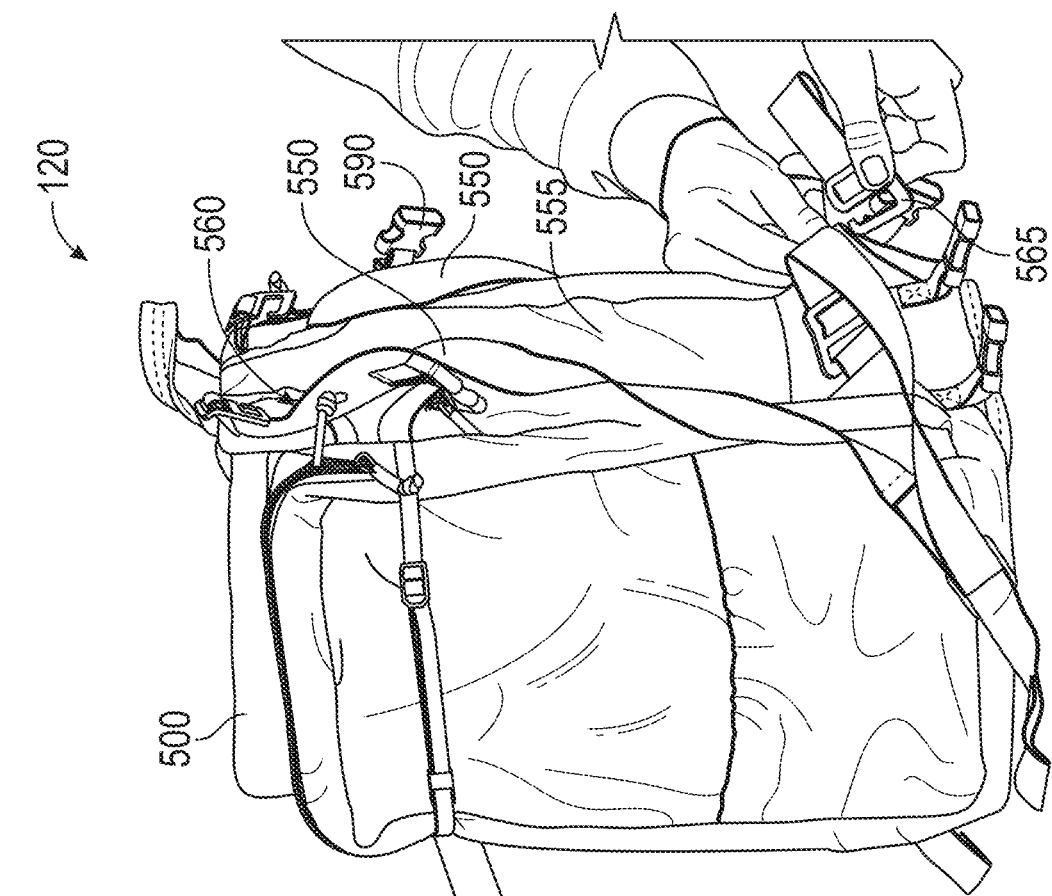
Figure 5E:
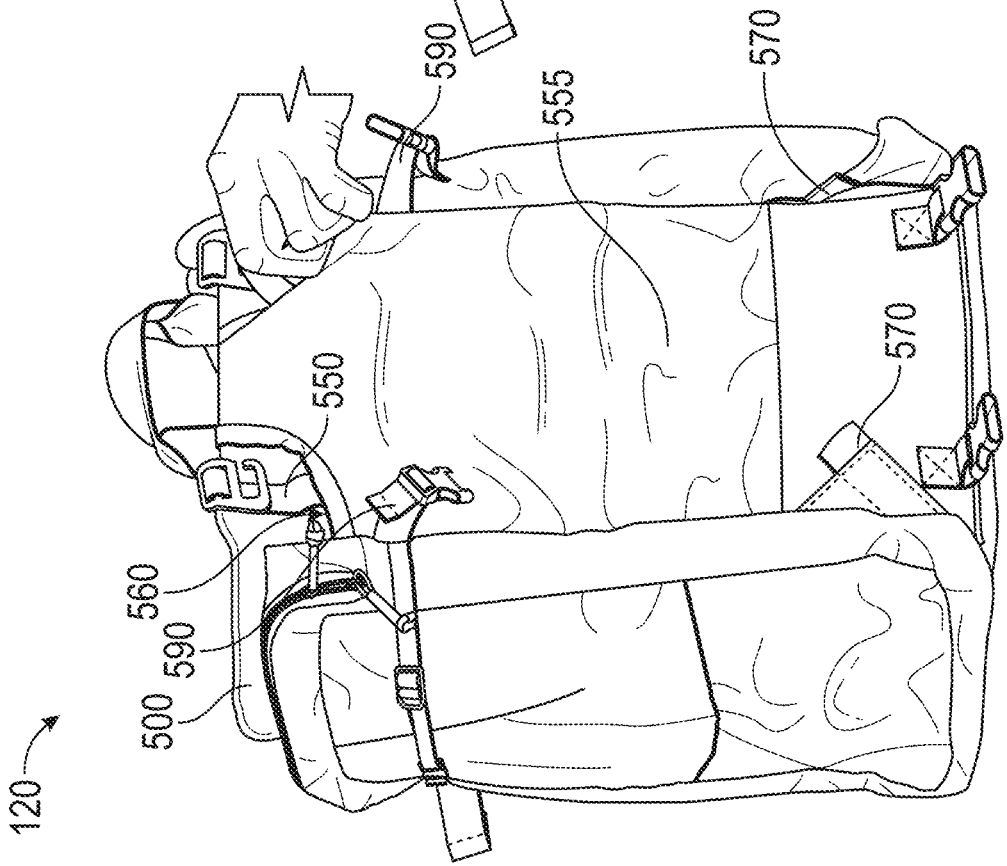

FIGS. 5E and 5F illustrate front perspective and side-front perspective views, respectively, of the pack portion 120, in accordance with embodiments of the present technology. With reference to both FIGS. 5E and 5F, in some embodiments, the pack portion 120 further comprises one or more additional shoulder straps 550 for a user to carry the pack portion 120 separately and independent of the carrying assembly 130 and independent of the platform assembly 115. The additional shoulder straps 550 may be stowable and deployable, e.g., they may be stowable between layers of material forming at least part of the pack portion 120. For example, in FIG. 5E, a front panel 555 of the pack portion 120 may include a strap storage space 560 for tucking or storing the additional shoulder straps 550 into the front panel 555 when they are not in use.

In some embodiments, the strap storage space 560 may be formed by two adjacent layers of material forming the front panel 555, with one or more openings for accessing a space between the two adjacent layers. In FIG. 5F, a user is shown deploying the additional shoulder straps 550 from the strap storage space 560. Ends of the additional shoulder straps 550 may include G-hooks or J-hooks 565, or other connection elements, for engaging loops 570 attached to the pack portion 120 toward a bottom end to form loops with the additional shoulder straps 550 for a user to don the pack portion 120.

Figure 5G:
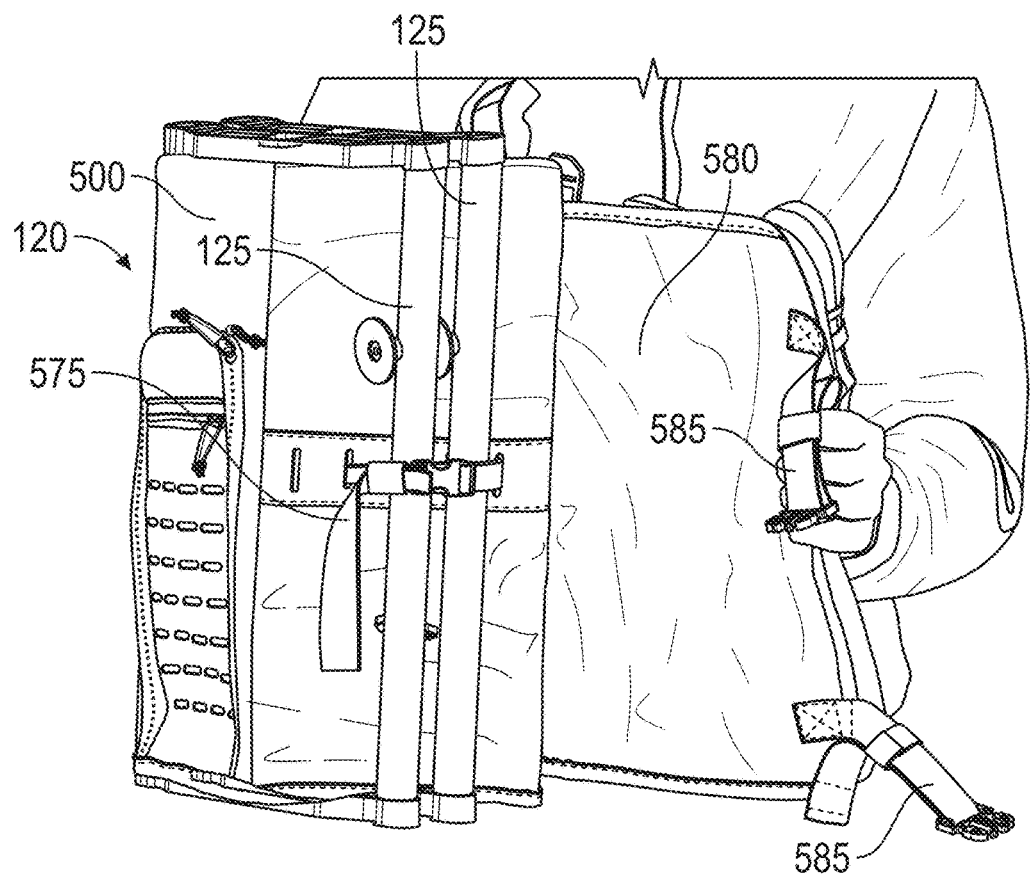
Figure 5H:
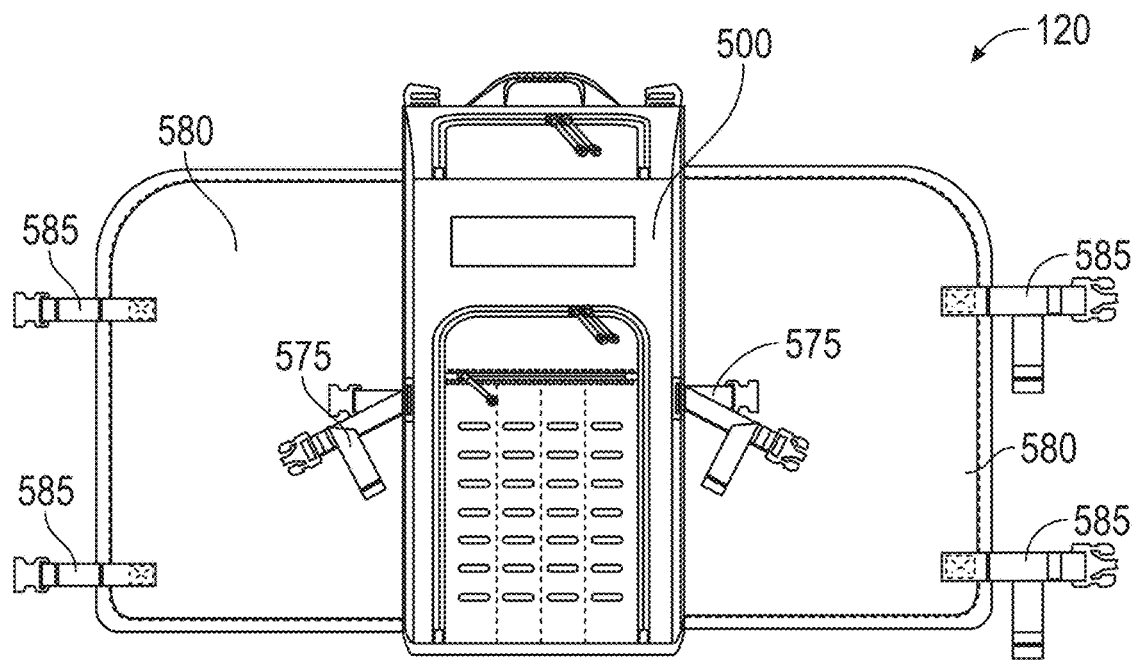
Figure 5I:
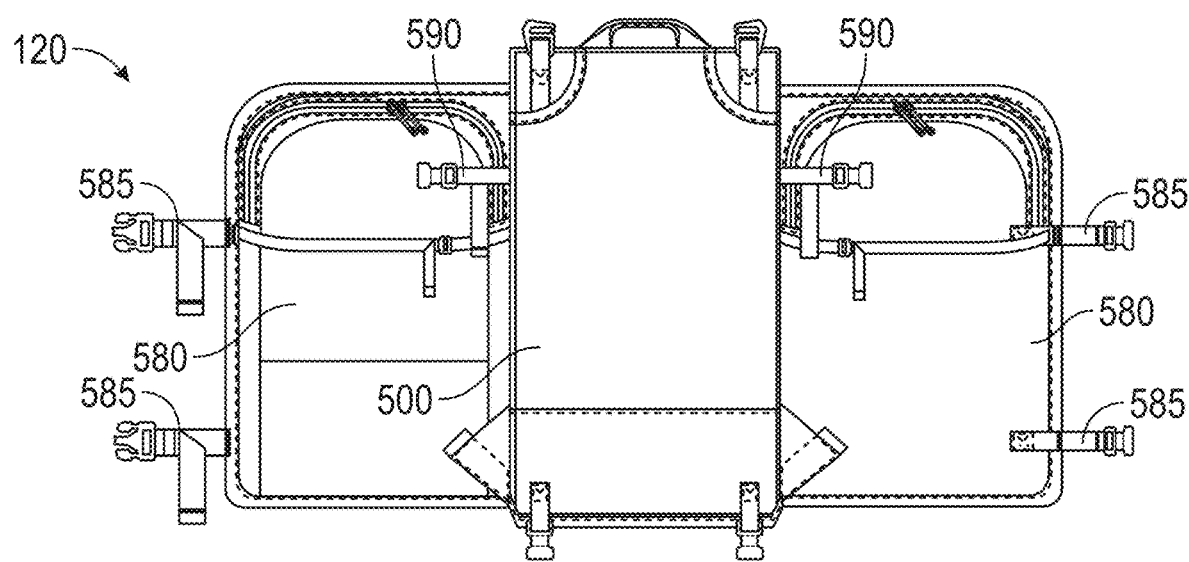

FIGS. 5G, 5H, and 5I illustrate a side perspective, rear plan, and front plan view of the pack portion 120, in accordance with embodiments of the present technology. In FIG. 5G, two of the ladder portions 125 are shown nested around the central compartment 500 (i.e., the central compartment 500 is positionable between the rungs 310 and between the elongated siderails 305). Although only two ladder portions 125 are shown in FIG. 5G, more or fewer ladder portions 125 may be carried around the central compartment 500.

In some embodiments, the pack portion 120 may include one or more straps 575 connected to the central compartment 500 (e.g., via one or more "MOLLE" type panels). The straps 575 may secure the ladder portions 125 to the central compartment 500. In some embodiments, the pack portion 120 may further include one or more wing panels 580 extending laterally from the central compartment 500 (e.g., two wing panels 580, each extending from opposing sides of the central compartment 500) and positionable to wrap around at least a portion of the central compartment 500 to at least partially surround the ladder portions 125 when the ladder portions 125 are nested around the central compartment.

In FIGS. 5G, 5H, and 5I, the wing panels 580 are open. In FIG. 5A, the wing panels 580 are closed around the central compartment 500, e.g., via connecting a plurality of straps 585 attached to the wing panels 580 to each other, around the central compartment 500. In FIG. 1, the wing panels 580 (only one is visible) are closed around the ladder portions 125 and the central compartment 500. With reference to FIG. 5A, the wing panels 580 may include some of the pockets 505, enabling the pack portion 120 to carry the ladder portions 125 and additional gear or supplies.

With reference to FIGS. 1, 5A, 5B, 5E, 5F, and 5I, in some embodiments, the pack portion 120 may include one or more straps 590 (which may include buckles or other connection elements) for wrapping around, lashing, or otherwise securing the platform assembly 115 or the carrying assembly 130 to the pack portion 120.

Figure 6A:
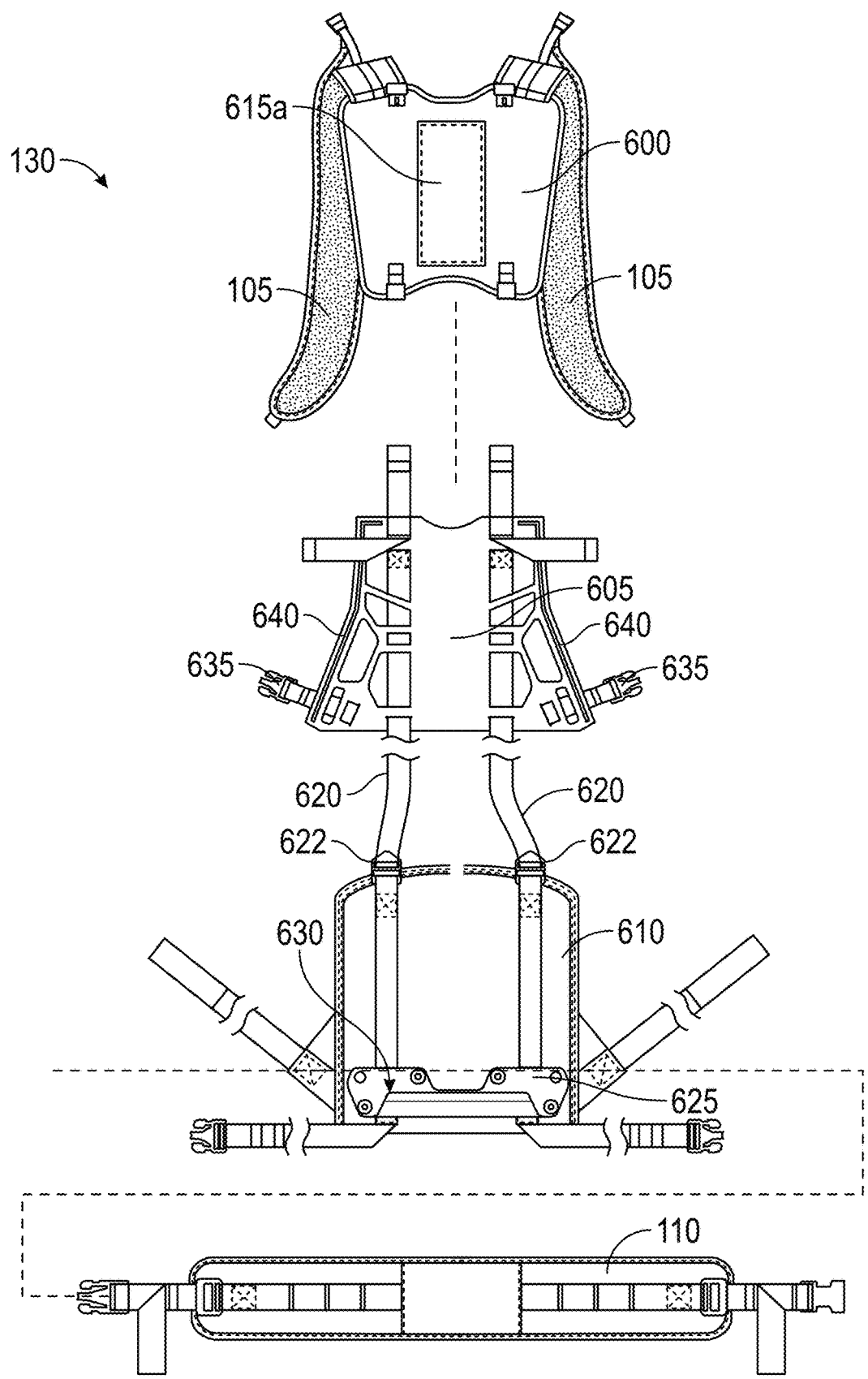
FIGS. 6A and 6B illustrate partially exploded plan views of rear and front sides, respectively, of several components of a carrying assembly of the system, in accordance with embodiments of the present technology.
Figure 6B:
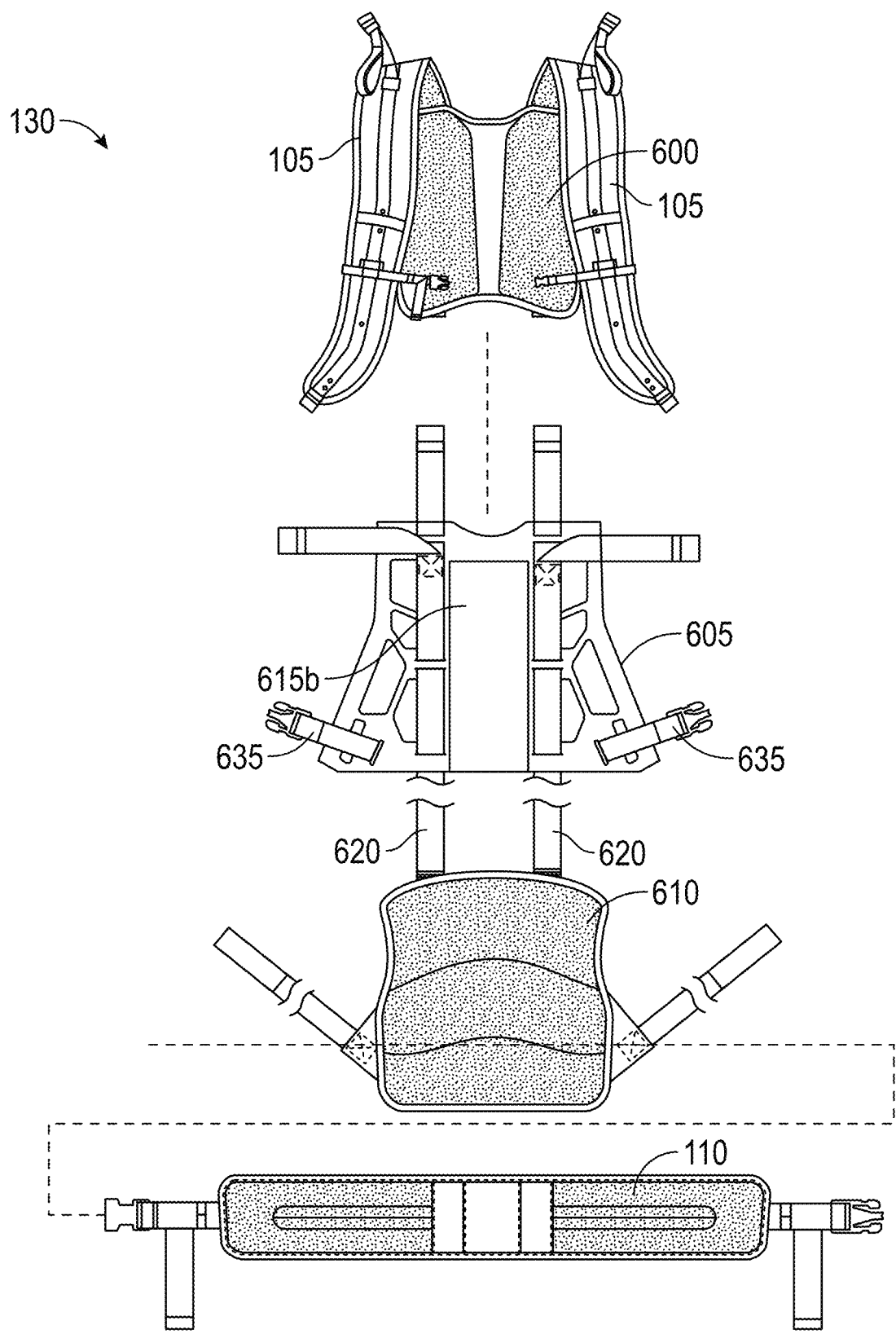

FIGS. 6A and 6B illustrate partially exploded plan views of rear and front sides, respectively, of several components of the carrying assembly 130, in accordance with embodiments of the present technology. With reference to FIGS. 6A and 6B, in some embodiments, the carrying assembly 130 may include one or more of: a flexible upper back panel 600, an upper platform support panel 605 (which may be called an "upper bracket" in some embodiments, and which may or may not be entirely rigid), a flexible lower back panel 610, or the waist belt 110. One or more of the panels 600, 605, 610, and the waist belt 110 may be assembled together to form the carrying assembly 130.

In some embodiments, the upper back panel 600 includes the shoulder straps 105. The upper platform support panel 605 may be attachable to, and detachable from, the upper back panel 600 via attachment devices 615a (on the upper back panel 600) and 615b (on the upper platform support panel 605), which may include hook-and-loop fasteners (e.g., VELCRO®) or other suitable fasteners. Together, the upper back panel 600 and the upper platform support panel 605 may be called a "yoke," and they may connect to the lower back panel 610 via one or more adjustable straps 620 or another suitable tensioning mechanism. The adjustable straps 620 may include any suitable length-adjustment or tension-adjustment mechanism 622, such as D-rings, sliders, or other strap adjustment devices. The waist belt 110 may be connected to the lower back panel 610 in any suitable manner, for example, by sliding laterally into and through a pocket or opening in a side of the lower back panel 610.

To accommodate varying torso lengths of users, a distance between the lower back panel 610 and the upper back panel 600 may be adjustable by changing where the upper back panel 600 contacts the upper platform support panel 605 (e.g., by changing where the attachment devices 615a, 615b join together. When the attachment devices 615a, 615b are corresponding sides of a hook-and-loop (e.g., VELCRO®) connection, they can be aligned with each other to adjust the relative positions of the upper back panel 600 and the upper support panel 605 to customize the fit for a given user (e.g., the distance between the upper back panel 600 and the lower back panel 610 when the system 100 is in the stowed configuration.

Referring to FIG. 6A, in some embodiments, the carrying assembly 130 may include a lower platform support element 625 (which may also be called a "lower bracket," and which may or may not be rigid or entirely rigid) for supporting a lower part of the platform assembly 115 when the platform assembly 115 is in the stowed configuration for carrying, as generally illustrated in FIG. 1. For example, the lower platform support element 625 may include a slot or a notch 630 for receiving the distal end 420 of the base platform 400 (see FIGS. 4, 7A, and 8, and the corresponding description below). The lower platform support element 625 may be attached to the lower back panel 610 so the distal end 420 of the base platform 400 is balanced at a position near a user's lower back for comfortable weight distribution when carrying the system 100 in the stowed configuration (e.g., as in FIG. 1).

In some embodiments, the rigid support panel 605 (the "upper bracket") can include one or more receiving areas 640 (e.g., one or more slots or notches) for receiving or otherwise engaging one or more portions and/or edges of the base platform 400 to further support the base platform 400 with the upper platform support panel 605 (see FIGS. 1, 4, 7A, and 8, and the corresponding description below). In general, the upper platform support panel 605 is attachable to the base platform 400 by any suitable mechanism, hook, latch, etc. Tightening the adjustable straps 620 can draw the upper platform support panel 605 and the lower back panel 610 towards each other, to restrain the base platform 400 (e.g., between the receiving areas or slots 630, 640). An advantage of embodiments of the present technology is that an operator can quickly connect the upper platform support panel 605 and the lower back panel 610 to opposing ends of the base platform 400 and tighten the adjustable straps 620 to form an overall rigid back support (including the base platform 400) for the pack portion 120 and the ladder portions 125 for carrying the system, and an operator can quickly loosen the adjustable straps 620 to separate the base platform 400 from the carrying assembly 130 to deploy the system.

Any suitable arrangement of straps may be implemented to connect the carrying assembly 130, the platform assembly 115, and the pack portion 120 together, such that the shoulder straps 105 and the optional waist belt 110 support and secure the platform assembly 115 and the pack portion 120 on a user. For example, with reference to FIGS. 1, 6A, and 6B, the carrying assembly 130 may include one or more straps 635 (which may include buckles or other suitable connectors) for connecting to the straps 590 of the pack portion 120. In some embodiments, the upper platform support panel 605 or other panels of the carrying assembly 130 may include the straps 635 or other suitable features for securing the carrying assembly 130, the platform assembly 115, and the pack portion 120 together. In some embodiments, one or more of the shoulder straps 105 (or other features), the lower back panel 610, the upper back panel 600, the waist belt 110, or the upper platform support panel 605 may include padding material for comfort.

Accordingly, the system 100 is configurable from a stowed configuration for transporting the system 100 (e.g., as shown in FIG. 1), to a deployed configuration in which: the platform assembly 115 and the ladder portions 125 are separated from the pack portion 120; one or more of the ladder portions 125 are secured to the support structure 300; the platform assembly 115 is secured to the support structure 300; and a user can ascend the ladder portions 125 to sit or stand on the platform assembly 115. Meanwhile, the pack portion 120 is usable as its own transportable container while the system 100 is deployed.

Figure 7A:
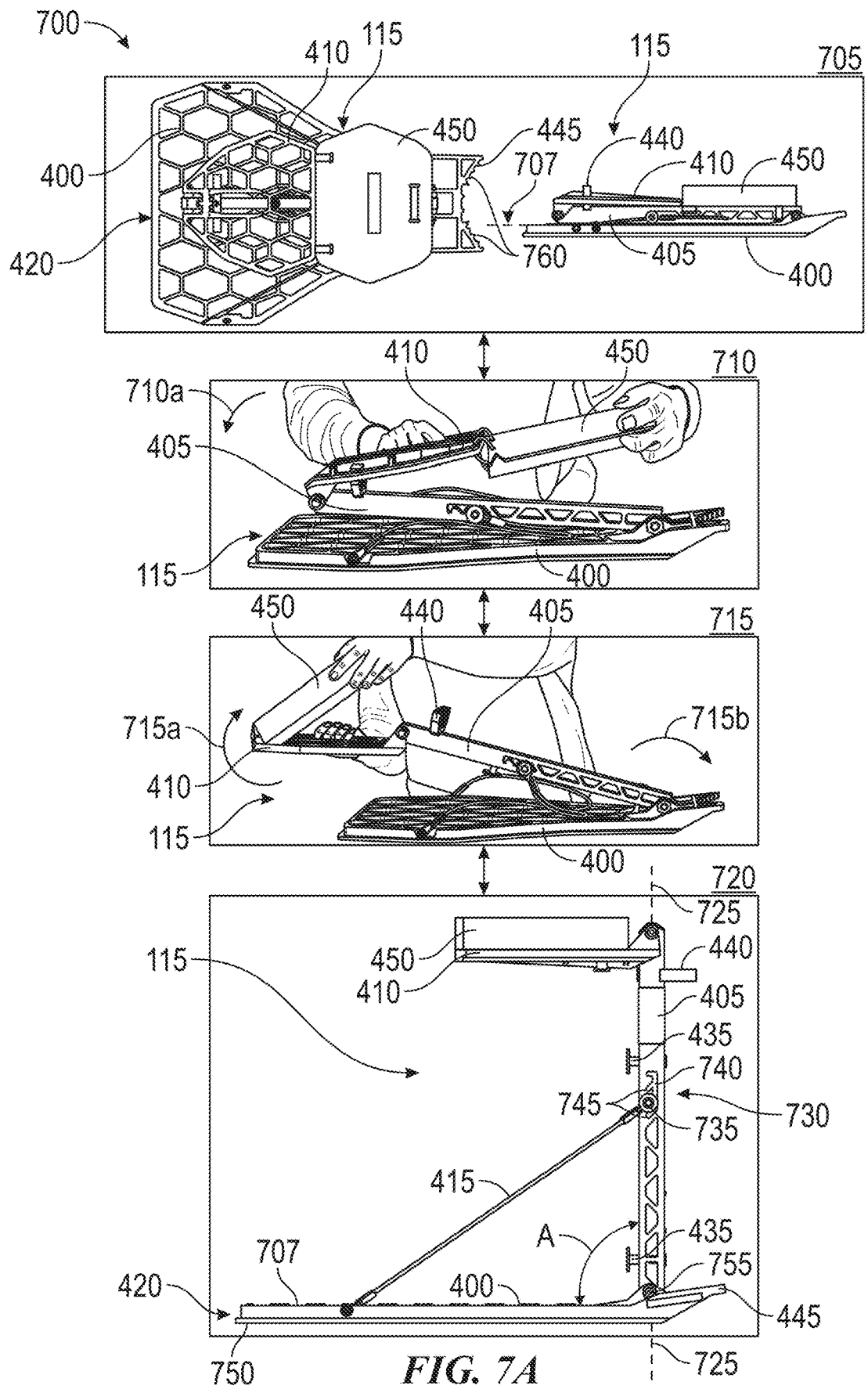
FIG. 7A illustrates a pictorial sequence or flow chart for demonstrating deployment of the platform assembly from the stowed configuration (e.g., in FIG. 1) to a deployed configuration suitable for attachment to the support structure.

FIG. 7A illustrates a pictorial sequence or flow chart 700 for demonstrating deployment of the platform assembly 115 from the stowed configuration (e.g., in FIG. 1) to a deployed configuration suitable for attachment to the support structure 300 (e.g., in FIG. 4). Block 705 shows a top plan view and a side profile view of the platform assembly 115 in the stowed configuration. In the stowed configuration, the base platform 400, the seat support post 405, the seat platform 410, and the optional cushioned seat 450 are aligned to form a low profile that is generally parallel to a standing plane 707 (i.e., a plane on which a user's feet will be supported) of the base platform 400. When the platform assembly 115 is in the stowed configuration, the seat support post 405 extends along, and adjacent to, the base platform, 400 and the seat platform 410 extends along, and adjacent to, the seat support post 405. In some embodiments, the blade portion 440 attached to the seat support post 405 extends through at least part of the seat platform 410, as generally shown in block 705, which further facilitates a compact stowed configuration. The stowed configuration facilitates including the platform assembly 115 in the overall system 100 for carrying by a user.

At block 710, a user may rotate the seat platform 410 and the optional cushioned seat 450 away from the seat support post 405 until the seat platform 410 is generally on the other side of the seat support post 405 (e.g., generally along rotational pathway 710a).

At block 715, the user rotates the optional cushioned seat 450 back over the seat platform 410 (e.g., generally along rotational pathway 715a). In some embodiments, the seat platform 410 is rotatable relative to the seat support post 405 through an angle of at least 250 degrees (e.g., 270 degrees) along rotational pathway 715a. The large angle of rotation between the seat platform 410 and the seat support post 405 facilitates compact stowage when the platform assembly 115 is in the stowed configuration. At block 715, the user can also rotate the seat support post 405 away from the base platform 400 (e.g., generally along rotational pathway 715b) until it is generally transverse (e.g., perpendicular) to the base platform 400.

At block 720, the platform assembly 115 is shown in the deployed configuration, ready to attach to a support structure. In the deployed configuration, the seat support post 405 extends transversely from the base platform 400, the seat platform 410 extends transversely from the seat support post 405, and the seat platform 410 is positioned above the base platform 400. The optional cushioned seat 450 (if any) is also positioned above the base platform 400. The blade portions 440, 445 are ready to engage the support structure. The platform assembly 115 may be moved to the stowed configuration by reversing the sequence in FIG. 7A.

In some embodiments, an angle A between the standing plane 707 and a longitudinal axis 725 of the seat support post 405 may be adjusted to accommodate various characteristics of the support structure, such as a tilt of the support structure away from a purely vertical axis. For example, in some embodiments, the platform assembly 115 may include an adjustment mechanism 730 that includes the one or more cables 415, one or more movable end elements 735 (e.g., knob elements) attached to one or more cables 415, and a slotted track 740 attached to or positioned in the seat support post 405. The slotted track 740 includes a plurality of downwardly angled support slots 745 distributed along a length of the support post 405 for receiving the movable end elements 735 at different locations along the longitudinal axis 725 of the seat support post 405 to change the angle between the seat support post 405 and the base platform 400.

In some embodiments, the distal end 420 of the base platform 400 includes a flange or lip portion 750 that may be received in the lower platform support element 625 (see FIG. 6A) and/or the upper platform support panel 605 (e.g., in the receiving areas, slots, or notches 640, as is further illustrated in FIG. 1, for example). The flange or lip portion 750 may extend at least partially around or along a perimeter of the base platform 400. With continued reference to FIG. 7A, in some embodiments, the blade portion 445 attached to the base platform 400 is offset from the standing plane 707 of the base portion, such that the blade portion 445 or its teeth 760 are closer to the upper end of the seat post 405 than the remainder of the base platform 400 (i.e. the blade portion 445 is between the standing plane 707 and the upper end of the seat post 405 where the seat platform 410 is connected).

In some embodiments, a pivot axis 755 is similarly elevated above the standing plane 707 or otherwise above a majority of the base platform 400. The offset positioning of the pivot axis 755 or the blade portion 445 reduces or prevents a springboard effect wherein the distal end 420 tends to rotate upwards toward the seat support post 405 when the platform assembly 115 is tightened against the support structure. The blade portion 445 may have any suitable number of teeth 760 or prongs to engage support structures having various shapes (e.g., the peripheral contours of a tree).

Figure 7B:
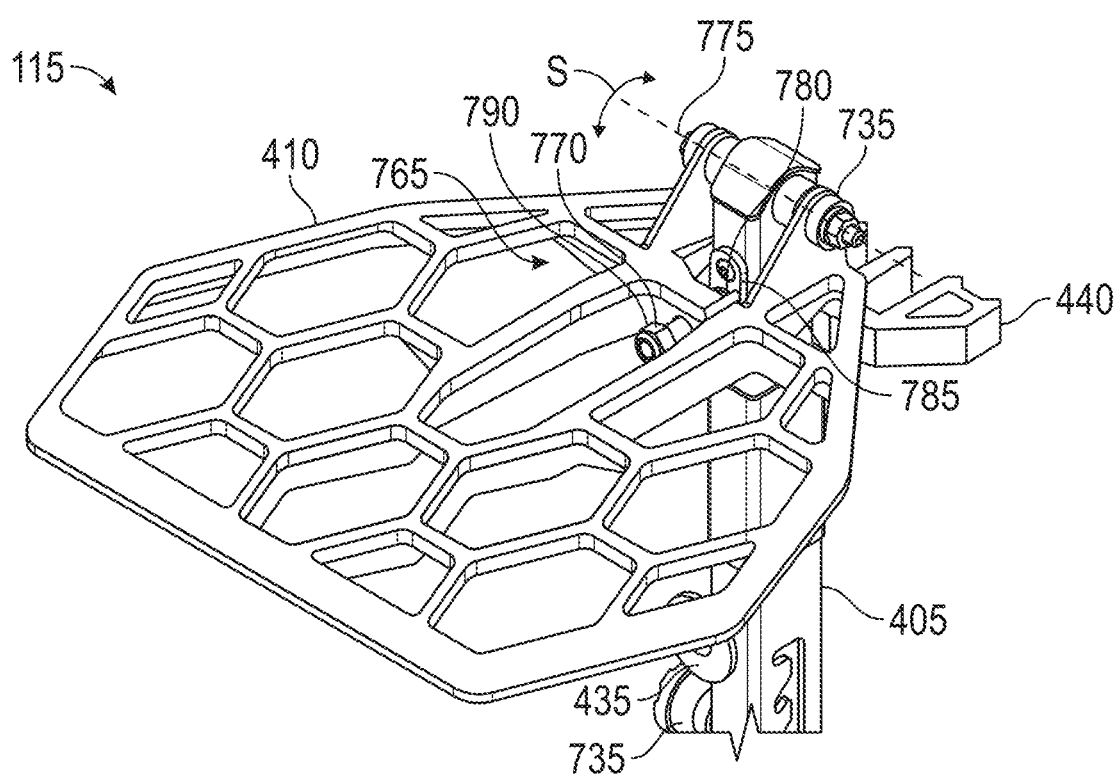
FIG. 7B illustrates a perspective view of part of the platform assembly.

FIG. 7B illustrates a perspective view of part of the platform assembly 115. In some embodiments, the system may include an adjustment mechanism 765 for adjusting an angle of the seat platform 410. In some embodiments, the adjustment mechanism 765 may include a fastener 770 that is rotatable to push the seat platform 410 away from the seat post 405 or to allow the seat platform 410 to rotate downward toward the seat post 405, by increasing or decreasing space between the seat post 405 and the seat platform 410 at an area located away from a pivot axis 775 between the seat post 405 and the seat platform 410.

In some embodiments, the fastener 770 may include a bolt head 780 that presses against the seat post 405 or against a plastic pad 785 attached to the seat post 405 that protects the seat post 405. A nut 790 may keep the fastener 770 from falling out of the seat platform 410. The seat platform 410 may include a threaded bore for receiving the fastener 770 such that the fastener 770 drives rotation of the seat platform 410 relative to the seat post 405 around angle S.

Figure 8:
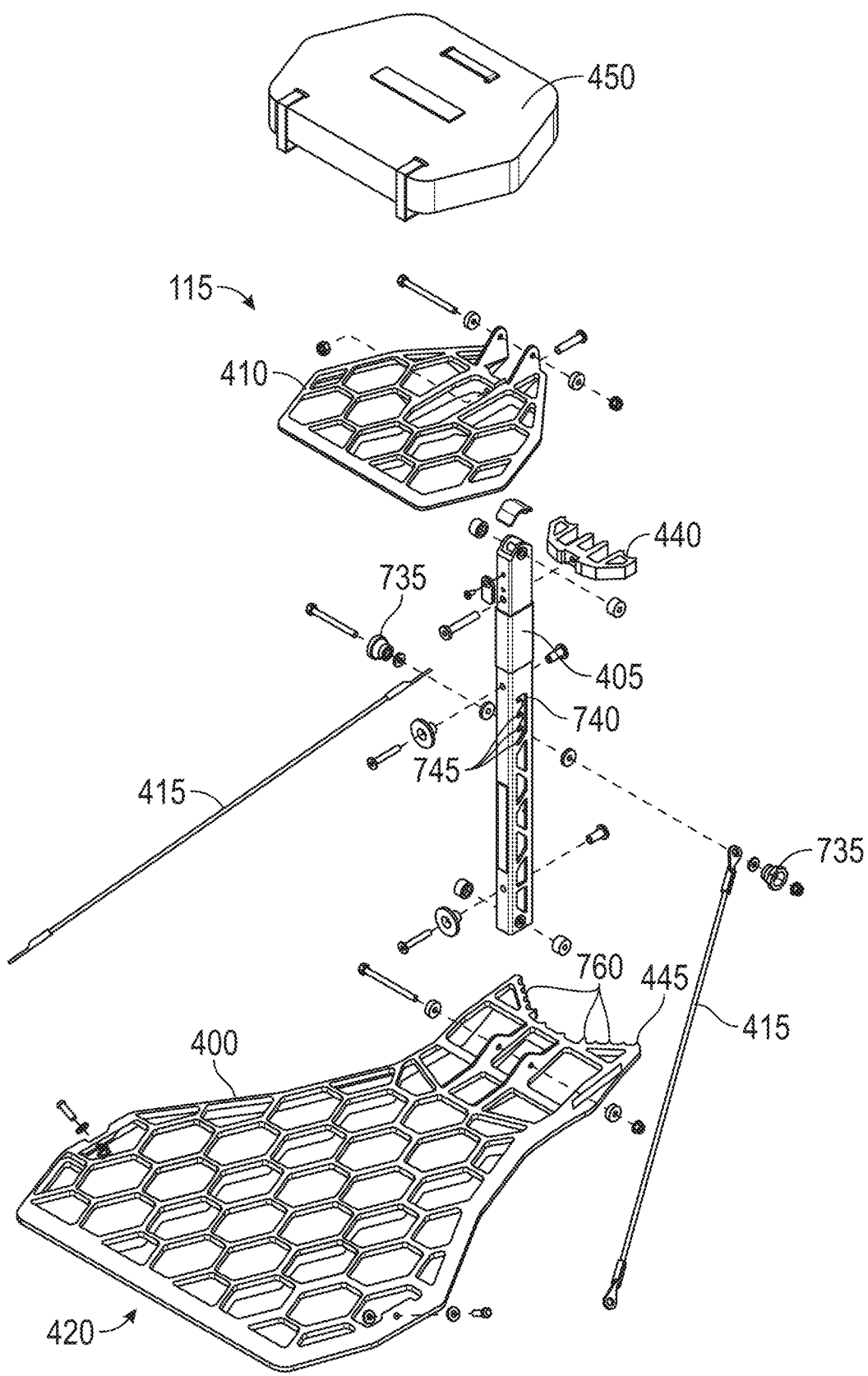
FIG. 8 illustrates an exploded perspective view of the platform assembly in a deployed configuration according to embodiments of the present technology.

FIG. 8 illustrates an exploded perspective view of the platform assembly 115 in a deployed configuration according to embodiments of the present technology. Components of the platform assembly 115 may be connected to each other with any suitable joints or fasteners.

Figure 9A:
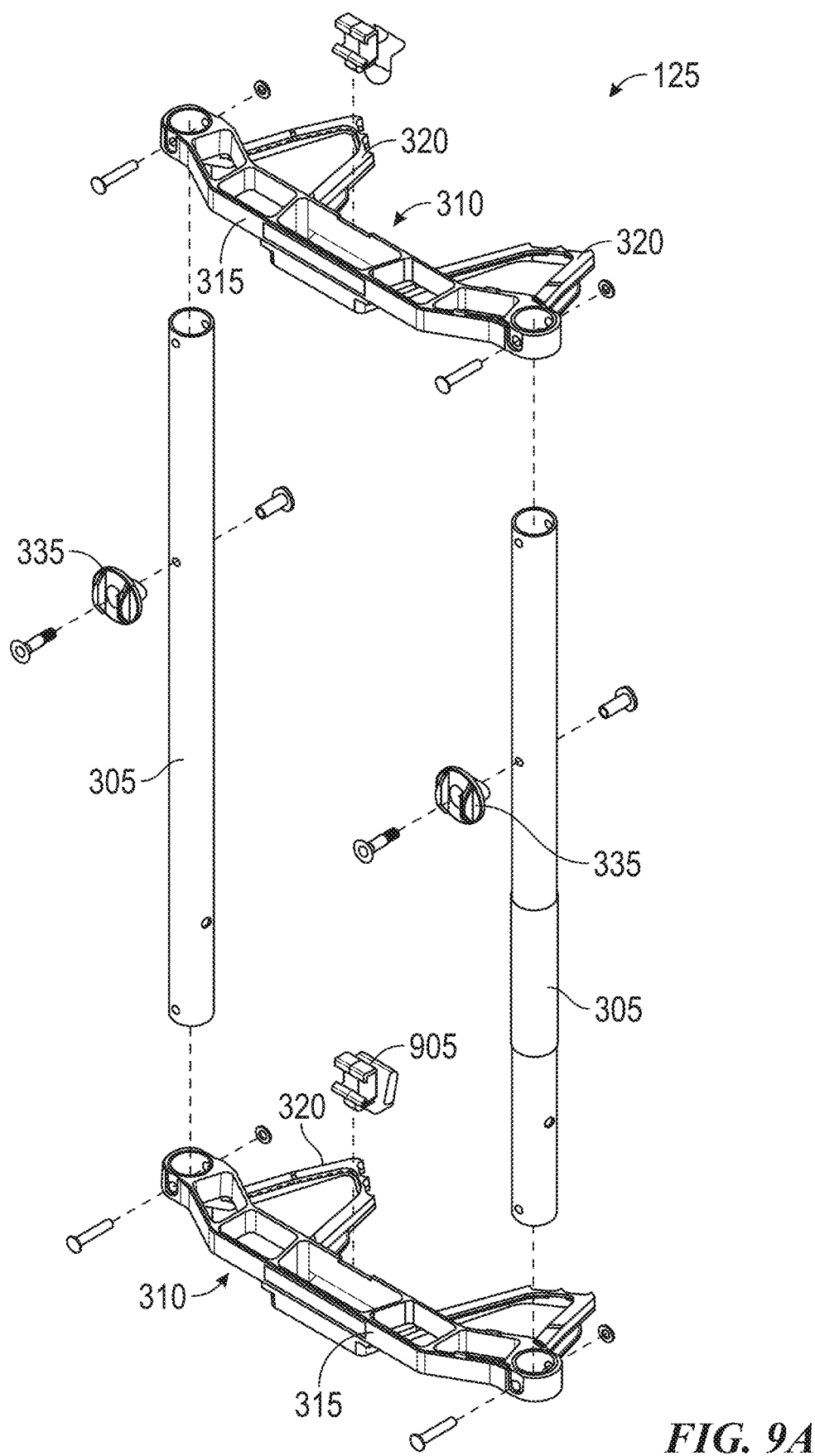
FIG. 9A illustrates an exploded perspective view of a ladder portion configured in accordance with embodiments of the present technology.

FIG. 9A illustrates an exploded perspective view of a ladder portion 125 configured in accordance with embodiments of the present technology. Components of the ladder portion 125 may be connected to each other with any suitable joints or fasteners. FIG. 9B illustrates a plan view of part of the ladder portion 125. In some embodiments, the blade portions 320 are offset from the step portion 315 along a vertical axis 900 of the ladder portion, which facilitates a user having an improved sense of foot positioning as they climb the ladder portion 125, and facilitates the step portion 315 or the blade portions 320 receiving aiders (e.g., straps) for additional climbing distance (e.g., the ladder portions 125 may be spaced apart along the support structure 300 with aiders facilitating a user's movement between the ladder portions 125).

The offset positioning of the step portion 315 and the blade portions 320 further enables nesting of multiple ladder portions 125, as shown, for example, in FIG. 2. With reference to FIGS. 2 and 9A, when the ladder portions 125 are nested with each other, the one or more blade portions 320 of an upper rung 310 nest with one or more blade portions 320 of another upper rung 310, for example, by one set of blade portions 320 extending under a step portion 315 of the other upper rung 310 and into the blade portions 320 of the other upper rung 310. Lower rungs 310 may nest in a similar manner. Accordingly, in some embodiments, upper rungs 310 may be generally identical to lower rungs 310.

FIG. 9C illustrates a detailed top perspective view of two rungs 310 nested together in accordance with embodiments of the present technology. In some embodiments, the system 100 may include one or more clip elements 905 positionable to connect two or more ladder portions 125 (specifically, by connecting a rung 310 of one ladder portion 125 to a rung 310 of another ladder portion 125) when the ladder portions 125 are nested together. In some embodiments, the clip elements 905 may connect the step portions 315 of adjacent rungs 310 to each other.

FIG. 9D illustrates a perspective view of one of the clip elements 905 configured in accordance with embodiments of the present technology. With reference to FIGS. 9A, 9C, and 9D, the clip element 905 may include a claw portion 910 having two flexible claws 915 positionable to grasp edges of a first rung 310 of a first ladder portion 125, and a hook portion 920 positionable to receive an edge of a second rung 310 of a second ladder portion 125. The edge of the second rung 310 can click into the hook portion 920 when the claws 915 are on the first rung 310, thereby securing the two rungs 310 together (and consequently, securing two ladder portions 125 together). To release the ladder portions 125, a user can press on a flexible lever 925 extending from the hook portion 920 to unhook the second rung 310 from the hook portion 920.

Figure 9F:
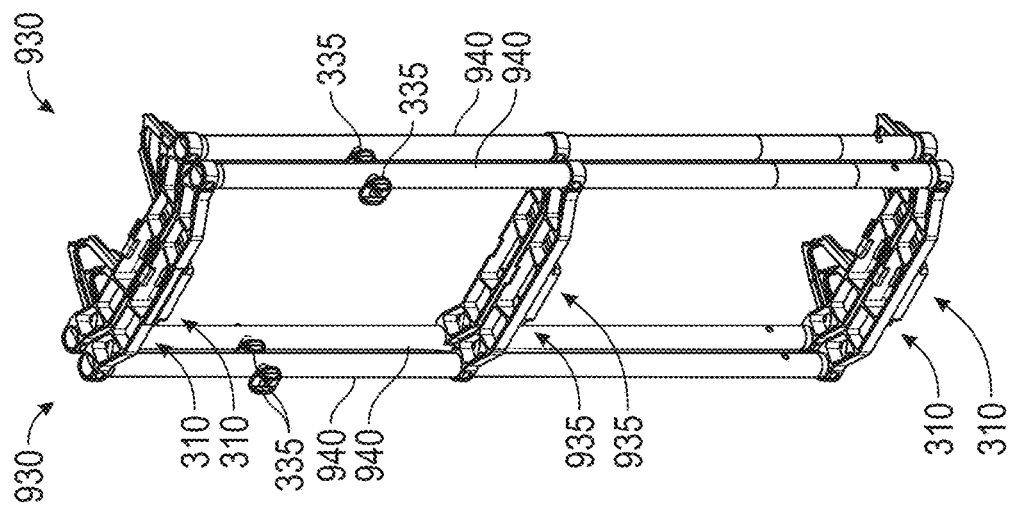
FIG. 9F illustrates a perspective view of two of the ladder portions shown in FIG. 9E, in a nested or stacked arrangement.
Figure 9E:
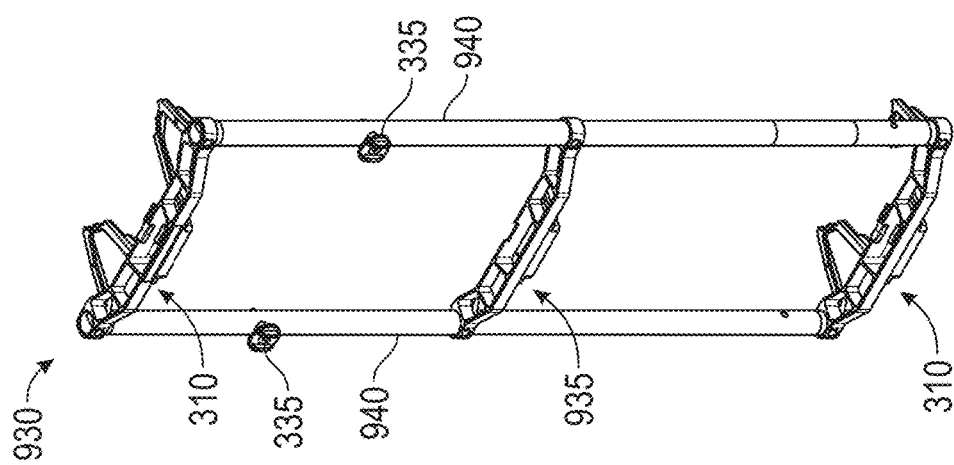
FIG. 9E illustrates a perspective view of a ladder portion configured in accordance with additional embodiments of the present technology.

Although two rungs 310 are shown and described for each ladder portion 125, in further embodiments, one or more additional intermediate rungs may be positioned between the two rungs. For example, FIG. 9E illustrates a perspective view of a ladder portion 930 configured in accordance with additional embodiments of the present technology. FIG. 9F illustrates a perspective view of two of the ladder portions 930 shown in FIG. 9E, nested or stacked together in a manner similar to the nesting or stacking of other ladder portions 125 (see, e.g., FIG. 2.) In some embodiments, each ladder portion 930 can include top and bottom rungs 310 and one or more intermediate rungs 935 positioned between the top and bottom rungs 310 and spanning between siderails 940. The siderails 940 can be generally similar to the siderails 305 of the ladder portion 125 described above, but optionally being longer to space apart the top and bottom rungs 310 to accommodate the one or more intermediate rungs 935. In some embodiments, the one or more intermediate rungs 935 can omit blade portions (e.g., the blade portions 320 on the rungs 310), or in other embodiments, the one or more intermediate rungs 935 can include blade portions such that the rungs 935 can be similar to the rungs 310.

The system 100 may include one or more accessories. FIGS. 10A-10D illustrate plan views of accessories according to embodiments of the present technology. For example, FIG. 10A illustrates a bottle pouch 1000 that is attachable to the pack portion 120, such as via MOLLE strap panels for receiving straps 1005 of the bottle pouch 1000. The bottle pouch 1000 may be attached to other portions of the system 100.

FIG. 10B illustrates a zippered pouch 1010, which may be made with mesh or another suitable material, and which may be attached to the MOLLE strap panels via one or more straps 1015. FIG. 10C illustrates another zippered pouch 1020 that may be attached to the pack portion 120 or other parts of the system 100, for example, by one or more straps 1025 engaging one or more MOLLE strap panels. FIG. 10D illustrates a strap 1030 for attaching any suitable object to the pack portion 120, a ladder portion 125, or a platform assembly 115. The strap 1030 may include a closed loop 1035 on one end (e.g., for placement around a strap attachment element 335, 435 described above), and an openable loop 1040 on another end (e.g., openable and closeable via a snap 1045 or another suitable releasable connector) for attaching to other objects, such as a MOLLE strap panel or another strap of another aspect of the present technology.

Embodiments of the present technology provide several advantages over conventional tree stands and pack systems. A single user can carry and deploy a stand, pack, ladder, and gear from a lightweight low-profile system. The ladder portions are more stable due to their two-siderail construction. The ladder portions can be spaced apart from each other by suitable distances to facilitate access to a desired height along the support structure for positioning the platform. Aiders may be hung from the ladder portions to further increase the spacing and maximum height of the ladder and platform structure. The platform provides structural support for the pack while a user carries the system, therefore the base platform and the carrying assembly (e.g., straps, panels, and brackets, etc.) form an adjustable pack system while the base platform doubles as a base for a user to stand on when the stand system is deployed. The platform 400 becomes the backbone of the remainder of the pack, and facilitates weight transfer from the remainder of the pack to the shoulder straps and the waist belt (if any), for a comfortable carrying experience when the user dons the system for carrying to a deployment location. The nesting capability of the ladder portions facilities convenient shipment of several ladder portions together.

Some embodiments of the present technology include kits of parts for portable ladder and stand systems, which may include any suitable combination of some or all parts disclosed herein, such as one or more pack portions, one or more ladder portions, one or more platform assemblies, etc. Further, the various parts and components disclosed herein may be connectable together to form systems, subassemblies, or assemblies in accordance with embodiments of the present technology.

From the foregoing, it will be appreciated that specific embodiments of the presently disclosed technology have been described herein for purposes of illustration, but that various modifications may be made without deviating from the scope of the technology. For example, anywhere that straps or buckles are involved to connect adjoining elements, in some embodiments, other connectors may be implemented, such as cables, clips, or other suitable devices. In some embodiments, blades for engaging a support surface (e.g., blade portions 320, 440, 445) may be carried by or attached to other components of the ladder portions 125 or the platform assembly 115, such as the seat platform 410, the seat post 405, or the siderails 305. The pack portion may further include a pouch for receiving a hydration pack and a passthrough for a straw or hose. Elements of the pack portion and the carrying assembly can include durable rip-stop materials, padding, or other materials suitable for durable and comfortable outdoor use.

Several additional aspects or embodiments of the present technology are set forth in the following examples, which may be combined with each other, and which may include more, fewer, or different elements than the elements in the examples:

1. A portable ladder and stand system comprising:
    a plurality of ladder portions, wherein the ladder portions are nestable with each other;
    a pack portion, wherein the pack portion comprises a central compartment and one or more first straps, and wherein the plurality of ladder portions are nestable around the central compartment and securable to the pack portion via the one or more first straps;
    a platform assembly, wherein the platform assembly comprises a base platform, a seat support post rotatably attached to the base platform toward a first end of the seat support post, and a seat platform rotatably attached to the seat support post toward a second end of the seat support post opposite the first end; and
    a carrying assembly attachable to at least one of the platform assembly or the pack portion and comprising one or more shoulder straps to facilitate carrying the system when the system is in a stowed configuration;
    wherein the system is configurable to a deployed configuration wherein the platform assembly and the ladder portions are separated from the pack portion, and wherein the seat support post and the seat platform are rotated to position the seat platform above the base platform.

2. The system of example 1, wherein each ladder portion of the plurality of ladder portions comprises:
    two elongated siderails, wherein the siderails are spaced apart from each other by a distance greater than a width of the pack portion; and
    two rungs, wherein a first rung of the two rungs is attached to a first end of each of the elongated siderails, and wherein a second rung of the two rungs is attached to a second end of each of the elongated siderails.

3. The system of example 2, wherein at least one of the first rung or the second rung comprises:
    a step portion; and
    one or more blade portions attached to the step portion and extending from the step portion, wherein the blade portions are engageable with a support structure to support the ladder portion on the support structure.

4. The system of example 3, wherein the blade portions are offset from the step portion along a vertical axis of the ladder portion.

5. The system of example 3, wherein when the ladder portions are nested with each other, the one or more blade portions of the at least one of the first rung or the second rung nests with one or more corresponding other blade portions of another rung of another ladder portion, with the one or more blade portions of the at least one of the first rung or the second rung extending under a step portion of the other ladder portion.

6. The system of example 3, wherein the first rung is identical to the second rung.

7. The system of example 2, wherein each elongated siderail carries a ladder mounting nub, and wherein the system further comprises a mounting strap for connecting to the ladder mounting nubs and lashing around a support structure.

8. The system of example 2, wherein the system further comprises one or more clip elements positionable to connect one or both rungs of a first ladder portion to one or both rungs of a second ladder portion when the first ladder portion is nested with the second ladder portion.

9. The system of example 1, wherein the pack portion further comprises wing panels extending laterally from the central compartment and positionable to wrap around at least a portion of the central compartment to connect to each other and at least partially surround the plurality of ladder portions when the plurality of ladder portions are nested around the central compartment.

10. The system of example 1, wherein the central compartment comprises two or more internal pockets.

11. The system of example 10, wherein the two or more internal pockets comprise an upper pocket formed at least in part by a closeable cover positioned on a top portion of the central compartment, and a lower compartment formed at least in part by a rear closeable cover.

12. The system of example 1, wherein the pack portion further comprises one or more additional shoulder straps, wherein each of the one or more additional shoulder straps is stowable between layers of material forming at least part of the pack portion, and wherein each of the one or more additional shoulder straps is deployable to facilitate carrying the central compartment separate from the platform assembly and the carrying assembly.

13. The system of example 1, wherein the platform assembly further comprises one or more cables extending from a portion of the seat support post to a portion of the base platform.

14. The system of example 13, wherein the platform assembly further comprises an adjustment mechanism for adjusting an angle between the seat support post and the base platform, wherein the adjustment mechanism comprises one or more end elements attached to the one or more cables and a plurality of angled support slots distributed along a length of the seat support post and positioned to receive the one or more end elements.

15. The system of example 1, wherein the seat support post comprises one or more seat mounting nubs, and wherein the system further comprises one or more platform mounting straps for connecting to the one or more seat mounting nubs and lashing around a support structure.

16. The system of example 1, further comprising a blade portion attached to the seat support post and extending from the seat support post, wherein the blade portion is engageable with a support structure to support the platform assembly on the support structure.

17. The system of example 1, further comprising a blade portion attached to the base platform and extending from the base platform, wherein the blade portion is engageable with a support structure to support the platform assembly on the support structure.

18. The system of example 17, wherein the blade portion is closer to the second end of the seat support post than is the base platform, thereby offsetting the blade portion from a standing plane of the base platform.

19. The system of example 17, wherein the blade portion comprises teeth positioned above an axis of rotation between the base platform and the seat post.

20. The system of example 1, wherein the base platform comprises a lip portion extending at least partially along a perimeter of the base platform, wherein the lip portion is positionable to engage a lower platform support element carried by the carrying assembly.

21. The system of example 1, wherein the platform assembly further comprises a seat rotatably attached to the seat platform.

22. The system of example 1, wherein the carrying assembly comprises a rigid support panel connected to the shoulder straps, wherein the platform assembly is attachable to the rigid support panel.

23. The system of example 22, wherein the carrying assembly comprises a flexible upper back portion, the flexible upper back portion includes the shoulder straps, and the rigid support panel is attachable to the upper back panel.

24. The system of example 22, further comprising a flexible lower back portion connectable to the rigid support panel and positionable below the rigid support panel and the shoulder straps.

25. The system of example 24, further comprising a waist belt attachable to the flexible lower back portion for wrapping around at least part of a user's waist region when the user dons the system.

26. The system of example 24, further comprising a lower platform support element attached to the flexible lower back portion and positionable to support the base platform when the base platform is attached to the carrying assembly.

27. The system of example 1, comprising a plurality of straps for attaching the platform assembly to the carrying assembly and for attaching the pack portion to the carrying assembly.

28. A portable ladder and stand system comprising:
a ladder portion;
at least one ladder attachment element positionable to support the ladder portion on a support structure, wherein the at least one ladder attachment element comprises a blade or a strap;
a platform assembly;
at least one platform attachment element positionable to support the platform assembly on a support structure, wherein the at least one platform attachment element comprises a blade or a strap;
a pack portion, wherein the ladder portion is positionable around at least part of the pack portion and securable to the pack portion, wherein the at least part of the pack portion is positioned between two rungs of the ladder portion or between two siderails of the ladder portion;
a carrying assembly comprising one or more shoulder straps; and
a plurality of carrying straps positionable to attach the carrying assembly to the platform assembly and the pack portion.

29. A portable ladder system comprising:
two or more ladder portions, wherein each ladder portion of the two or more ladder portions comprises two elongated siderails connecting at least two rungs; and
a pack portion comprising one or more shoulder straps;
wherein each ladder portion is positionable around, and supportable by, at least part of the pack portion, wherein the at least part of the pack portion is positionable between two of the at least two rungs and the two elongated siderails of each ladder portion of the two or more ladder portions.

30. The system of example 29, further comprising (a) one or more blade portions carried by each of the ladder portions to engage a support structure or (b) one or more straps for connecting one or more of the ladder portions to a support structure.

31. A ladder system comprising a plurality of separate, identical ladder portions, wherein:
each ladder portion of the plurality of ladder portions comprises two elongated siderails and two rungs;
for each ladder portion of the plurality of ladder portions, a first rung of the two rungs is attached to a first end of each of the two elongated siderails, and a second rung of the two rungs is attached to a second end of each of the two elongated siderails;
the ladder portions are nestable with each other; and
when the ladder portions are nested with each other, the first ends of each of the siderails are coplanar in a first plane, and the second ends of each of the siderails are coplanar in a second plane spaced apart from the first plane.

32. The ladder system of example 31, further comprising one or more aiders attachable to at least one of the two rungs, wherein the aiders form a U-shape below the at least one of the two rungs.

33. The ladder system of example 31, comprising a clip element for securing two ladder portions of the plurality of ladder portions together when the ladder portions are nested with each other, the clip element comprising:
a claw portion having two flexible claws positionable to grasp edges of the first rung of a first ladder portion; and
a hook portion positionable to receive an edge of a first rung of a second ladder portion.

34. A pack and stand system, comprising:
a base platform;
a blade portion attached to the base platform, wherein the blade portion extends from the base platform and is positionable to engage a support structure via at least one of friction or penetrating into a surface of the support structure;
an upper platform support panel comprising a slot for receiving a first part of the base platform;
a plurality of shoulder straps connected to, or connectable to, the upper support panel and configured to support the upper platform support panel on a user;
a lower platform support element comprising a slot for receiving a second part of the base platform distal from the first part; and
a tensioning mechanism connecting the upper support panel to the lower platform support element and positioned to selectively draw the upper support panel and the lower platform support element toward each other;
wherein the pack and stand system is configurable to a stowed configuration in which (a) the upper platform support panel engages the first part of the base platform, (b) the lower platform support element engages the second part of the base platform, and (c) the tensioning mechanism draws the upper platform support panel and the lower platform support element toward each other; and
when the pack and stand system is in the stowed configuration, the base platform is secured to the plurality of shoulder straps for a user to don the pack and stand system.

35. The pack and stand system of example 34, wherein each shoulder strap of the plurality of shoulder straps is attached to a flexible upper back panel, and wherein the flexible upper back panel is attached to the upper support panel via an adjustable connection, wherein the flexible upper back panel is attachable to the upper support panel at multiple locations to adjust a distance between the flexible upper back panel and the lower platform support element when the pack and stand system is in the stowed configuration.

36. A stand system comprising a platform assembly, wherein:
(a) the platform assembly comprises a base platform, a seat support post rotatably attached to the base platform toward a first end of the seat support post, and a seat platform rotatably attached to the seat support post toward a second end of the seat support post opposite the first end;
(b) the platform assembly is movable between a stowed configuration and a deployed configuration;
(c) when the platform assembly is in the stowed configuration, the seat support post extends along, and adjacent to, the base platform, and the seat platform extends along, and adjacent to, the seat support post;
(d) when the platform assembly is in the deployed configuration, the seat support post extends transversely from the base platform, the seat platform extends transversely from the seat support post, and the seat platform is positioned above the base platform; and
(e) the seat platform is rotatable relative to the seat support post through an angle of at least 250 degrees.

37. The stand system of example 36, wherein when the platform assembly is in the stowed configuration, a blade portion attached to the seat support post extends through at least part of the seat platform.

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. To the extent any materials incorporated herein by reference conflict with the present disclosure, the present disclosure controls.

What is claimed is:

1. A portable ladder and stand system comprising:
(a) two or more ladder portions, wherein the ladder portions are nestable with each other, and wherein each ladder portion comprises two elongated siderails connecting a first rung to a second rung;
(b) a pack portion, wherein the pack portion comprises a central compartment and one or more first straps, wherein the ladder portions are nestable around the central compartment and securable to the pack portion via the one or more first straps, and wherein when the ladder portions are nested around the central compartment, the central compartment is positioned between the elongated siderails and between the rungs;
(c) a platform assembly, wherein the platform assembly comprises a base platform, a seat support post rotatably attached to the base platform toward a first end of the seat support post, and a seat platform rotatably attached to the seat support post toward a second end of the seat support post opposite the first end; and
(d) a carrying assembly attachable to at least one of the platform assembly or the pack portion and comprising one or more shoulder straps to facilitate carrying the portable ladder and stand system when the portable ladder and stand system is in a stowed configuration;
wherein the portable ladder and stand system is configurable to a deployed configuration wherein the platform assembly and the ladder portions are separated from the pack portion, and wherein the seat support post and the seat platform are rotated to position the seat platform above the base platform.

2. The portable ladder and stand system of claim 1, wherein at least one of the first rung or the second rung comprises:
a step portion; and
a blade portion attached to the step portion and extending from the step portion, wherein the blade portion is engageable with a support structure to support the ladder portion on the support structure.

3. The portable ladder and stand system of claim 2, wherein the blade portion is offset from the step portion along a vertical axis of the ladder portion.

4. The portable ladder and stand system of claim 2, wherein when the ladder portions are nested with each other, the blade portion nests with one or more corresponding other blade portions of another rung of a second ladder portion of the two or more ladder portions, with the blade portion of the at least one of the first rung or the second rung extending under a step portion of the second ladder portion.

5. The portable ladder and stand system of claim 1, wherein each elongated siderail carries a ladder mounting nub, and wherein the portable ladder and stand system further comprises a mounting strap for connecting to each ladder mounting nub and lashing around a support structure.

6. The portable ladder and stand system of claim 1, wherein the portable ladder and stand system further comprises one or more clip elements positionable to connect one or both rungs of a first ladder portion of the two or more ladder portions to one or both rungs of a second ladder portion of the two or more ladder portions when the first ladder portion is nested with the second ladder portion.

7. The portable ladder and stand system of claim 1, wherein the pack portion further comprises wing panels extending laterally from the central compartment and positionable to wrap around at least a portion of the central compartment to connect to each other and at least partially surround the ladder portions when the ladder portions are nested around the central compartment.

8. The portable ladder and stand system of claim 1, wherein the central compartment comprises an upper pocket formed at least in part by a closeable cover positioned on a top portion of the central compartment, and a lower compartment formed at least in part by a rear closeable cover.

9. The portable ladder and stand system of claim 1, wherein the pack portion further comprises one or more additional shoulder straps, wherein each of the one or more additional shoulder straps is stowable between layers of material forming at least part of the pack portion, and wherein each of the one or more additional shoulder straps is deployable to facilitate carrying the central compartment separate from the platform assembly and the carrying assembly.

10. The portable ladder and stand system of claim 1, wherein the platform assembly further comprises one or more cables extending from a portion of the seat support post to a portion of the base platform.

11. The portable ladder and stand system of claim 10, wherein the platform assembly further comprises an adjustment mechanism for adjusting an angle between the seat support post and the base platform, wherein the adjustment mechanism comprises one or more end elements attached to the one or more cables and a plurality of angled support slots distributed along a length of the seat support post and positioned to receive the one or more end elements.

12. The portable ladder and stand system of claim 1, wherein the seat support post comprises one or more seat mounting nubs, and wherein the portable ladder and stand system further comprises one or more platform mounting straps for connecting to the one or more seat mounting nubs and lashing around a support structure.

13. The portable ladder and stand system of claim 1, further comprising a blade portion attached to the seat support post and extending from the seat support post, wherein the blade portion is engageable with a support structure to support the platform assembly on the support structure.

14. The portable ladder and stand system of claim 1, further comprising a blade portion attached to the base platform and extending from the base platform, wherein the blade portion is engageable with a support structure to support the platform assembly on the support structure.

15. The portable ladder and stand system of claim 14, wherein the blade portion is closer to the second end of the seat support post than is the base platform, thereby offsetting the blade portion from a standing plane of the base platform.

16. The portable ladder and stand system of claim 14, wherein:
the blade portion comprises teeth;
rotatable attachment between the seat support post and the base platform defines an axis of rotation between the base platform and the seat support post; and
when the seat support post is rotated to position the seat platform above the base platform, the teeth are positioned above the axis.

17. The portable ladder and stand system of claim 1, wherein the base platform comprises a lip portion extending at least partially along a perimeter of the base platform, wherein the lip portion is positionable to engage a lower platform support element carried by the carrying assembly.

18. The portable ladder and stand system of claim 1, wherein the platform assembly further comprises a seat rotatably attached to the seat platform.

19. The portable ladder and stand system of claim 1, wherein the carrying assembly comprises a rigid support panel connected to the one or more shoulder straps, wherein the platform assembly is attachable to the rigid support panel.

20. The portable ladder and stand system of claim 19, wherein the carrying assembly comprises a flexible upper back portion, the flexible upper back portion includes the one or more shoulder straps, and the rigid support panel is attachable to the flexible upper back portion.

21. The portable ladder and stand system of claim 19, further comprising a flexible lower back portion connectable to the rigid support panel and positionable below the rigid support panel and the one or more shoulder straps.

22. The portable ladder and stand system of claim 21, further comprising a waist belt attachable to the flexible lower back portion for wrapping around at least part of a user's waist region.

23. The portable ladder and stand system of claim 21, further comprising a lower platform support element attached to the flexible lower back portion and positionable to support the base platform when the base platform is attached to the carrying assembly.

24. The portable ladder and stand system of claim 1, comprising a plurality of straps for attaching the platform assembly to the carrying assembly and for attaching the pack portion to the carrying assembly.

25. A portable ladder and stand system comprising:
a ladder portion, wherein the ladder portion comprises two siderails;
at least one ladder attachment element positionable to support the ladder portion on a support structure, wherein the at least one ladder attachment element comprises a blade or a strap;
a platform assembly;
at least one platform attachment element positionable to support the platform assembly on a support structure, wherein the at least one platform attachment element comprises a blade or a strap;
a pack portion, wherein the ladder portion is positionable around at least part of the pack portion and securable to the pack portion, wherein the at least part of the pack portion is positioned between two rungs of the ladder portion or between the two siderails of the ladder portion;
a carrying assembly comprising one or more shoulder straps; and
a plurality of carrying straps positionable to attach the carrying assembly to the platform assembly and the pack portion.

26. The portable ladder and stand system of claim 25, wherein the ladder portion is positionable to surround a perimeter of a central compartment of the pack portion.

27. A pack and stand system, comprising:
a base platform, wherein the base platform comprises a flange extending at least partially around a perimeter of the base platform;
a blade portion attached to the base platform, wherein the blade portion extends from the base platform and is positionable to engage a support structure via at least one of friction or penetrating into a surface of the support structure;
an upper platform support panel comprising a slot for receiving at least part of the flange;
a plurality of shoulder straps connected to, or connectable to, the upper platform support panel and configured to support the upper platform support panel on a user;
a lower platform support element comprising a slot for receiving a part of the base platform distal from the at least part of the flange; and
a tensioning mechanism connecting the upper platform support panel to the lower platform support element and positioned to selectively draw the upper platform support panel and the lower platform support element toward each other;
wherein the pack and stand system is configurable to a stowed configuration in which (a) the slot of the upper platform support panel engages the at least part of the flange, (b) the lower platform support element engages the part of the base platform distal from the at least part of the flange, and (c) the tensioning mechanism draws the upper platform support panel and the lower platform support element toward each other; and
when the pack and stand system is in the stowed configuration, the base platform is secured to the plurality of shoulder straps for a user to don the pack and stand system.

28. The pack and stand system of claim 27, wherein each shoulder strap of the plurality of shoulder straps is attached to a flexible upper back panel, and wherein the flexible upper back panel is attached to the upper platform support panel via an adjustable connection, wherein the flexible upper back panel is attachable to the upper platform support panel at multiple locations to adjust a distance between the flexible upper back panel and the lower platform support element when the pack and stand system is in the stowed configuration.

29. A stand system comprising a platform assembly, wherein:
(a) the platform assembly comprises a base platform, a seat support post rotatably attached to the base platform toward a first end of the seat support post, and a seat platform rotatably attached to the seat support post toward a second end of the seat support post opposite the first end;
(b) the platform assembly is movable between a stowed configuration and a deployed configuration;
(c) when the platform assembly is in the stowed configuration, the seat support post extends along, and adjacent to, the base platform, and the seat platform extends along, and adjacent to, the seat support post;
(d) when the platform assembly is in the deployed configuration, the seat support post extends transversely from the base platform, the seat platform extends transversely from the seat support post, and the seat platform is positioned above the base platform;
(e) the seat platform is rotatable relative to the seat support post through an angle of at least 250 degrees;
(f) when the platform assembly is in the stowed configuration, a blade portion attached to the seat support post extends through at least part of the seat platform; and
(g) the base platform comprises a blade portion, wherein when the platform assembly is in the deployed configuration, the blade portion is closer to the seat platform than is a standing plane of the base platform, thereby offsetting the blade portion from the standing plane.

30. A portable ladder and stand system comprising:
(a) two or more ladder portions, wherein the ladder portions are nestable with each other;
(b) a pack portion, wherein the pack portion comprises a central compartment and one or more first straps, each first strap of the one or more first straps is positioned at a lateral side of the central compartment, and wherein the ladder portions are nestable around the central compartment and securable to the pack portion via the one or more first straps restraining one or more siderails of the ladder portions;
(c) a platform assembly, wherein the platform assembly comprises a base platform, a seat support post rotatably attached to the base platform toward a first end of the seat support post, and a seat platform rotatably attached to the seat support post toward a second end of the seat support post opposite the first end; and
(d) a carrying assembly attachable to at least one of the platform assembly or the pack portion and comprising one or more shoulder straps to facilitate carrying the portable ladder and stand system when the portable ladder and stand system is in a stowed configuration;
wherein the portable ladder and stand system is configurable to a deployed configuration wherein the platform assembly and the ladder portions are separated from the pack portion, and wherein the seat support post and the seat platform are rotated to position the seat platform above the base platform.

31. The portable ladder and stand system of claim 30, further comprising one or more wing panels extending laterally from the central compartment and positionable to wrap around at least a portion of the central compartment and to at least partially cover the one or more first straps.

32. A portable ladder and stand system comprising:
(a) two or more ladder portions, wherein the ladder portions are nestable with each other;
(b) a pack portion, wherein the pack portion comprises a central compartment and one or more wing panels extending laterally from the central compartment, the ladder portions are nestable around the central compartment, and each wing panel of the one or more wing panels is positionable to wrap around at least a portion of the central compartment and at least partially surround siderails of the ladder portions when the ladder portions are nested around the central compartment;
(c) a platform assembly, wherein the platform assembly comprises a base platform, a seat support post rotatably attached to the base platform toward a first end of the seat support post, and a seat platform rotatably attached to the seat support post toward a second end of the seat support post opposite the first end; and (d) a carrying assembly attachable to at least one of the platform assembly or the pack portion and comprising one or more shoulder straps to facilitate carrying the portable ladder and stand system when the portable ladder and stand system is in a stowed configuration;

wherein the portable ladder and stand system is configurable to a deployed configuration wherein the platform assembly and the ladder portions are separated from the pack portion, and wherein the seat support post and the seat platform are rotated to position the seat platform above the base platform.

33. A portable ladder and stand system comprising:

(a) two or more ladder portions, wherein the ladder portions are nestable with each other;

(b) a pack portion, wherein the pack portion comprises a central compartment and one or more first straps, and wherein the ladder portions are nestable around the central compartment and securable to the pack portion via the one or more first straps;

(c) a platform assembly, wherein the platform assembly comprises a base platform, a seat support post rotatably attached to the base platform toward a first end of the seat support post, and a seat platform rotatably attached to the seat support post toward a second end of the seat support post opposite the first end, and wherein the base platform comprises a flange extending at least partially around a perimeter of the base platform; and (d) a carrying assembly attachable to the platform assembly and comprising one or more shoulder straps to facilitate carrying the portable ladder and stand system when the portable ladder and stand system is in a stowed configuration, wherein the carrying assembly comprises one or more slots for receiving the flange;

wherein the portable ladder and stand system is configurable to a deployed configuration wherein the platform assembly and the ladder portions are separated from the pack portion, and wherein the seat support post and the seat platform are rotated to position the seat platform above the base platform.

34. A portable ladder and stand system comprising:

(a) two or more ladder portions, wherein each ladder portion comprises a rung and a siderail, wherein for each ladder portion, each rung comprises a step portion and a blade portion extending from the step portion for connecting the ladder portion to a support structure, and wherein, for each rung, the step portion and the blade portion form a single unitary component and the blade portion is offset from the step portion along a direction aligned with a longitudinal axis of the siderail;

(b) a pack portion, wherein the pack portion comprises a central compartment and one or more first straps, and wherein the ladder portions are nestable around the central compartment and securable to the pack portion via the one or more first straps;

(c) a platform assembly, wherein the platform assembly comprises a base platform, a seat support post rotatably attached to the base platform toward a first end of the seat support post, and a seat platform rotatably attached to the seat support post toward a second end of the seat support post opposite the first end; and (d) a carrying assembly attachable to at least one of the platform assembly or the pack portion and comprising one or more shoulder straps to facilitate carrying the portable ladder and stand system when the portable ladder and stand system is in a stowed configuration;

wherein the portable ladder and stand system is configurable to a deployed configuration wherein the platform assembly and the ladder portions are separated from the pack portion, and wherein the seat support post and the seat platform are rotated to position the seat platform above the base platform.

\* \* \* \* \*